United States Patent
Chen et al.

(10) Patent No.: US 11,673,547 B2
(45) Date of Patent: Jun. 13, 2023

(54) DYNAMIC ELEMENT PROTECTION

(71) Applicant: Apple Inc., Cupertino, CA (US)

(72) Inventors: Tie-Qi Chen, Cupertino, CA (US);
Benjamin B. Lyon, Saratoga, CA (US);
Byron B. Han, Cupertino, CA (US);
Ahmad Al-Dahle, San Jose, CA (US)

(73) Assignee: Apple Inc., Cupertino, CA (US)

(*) Notice: Subject to any disclaimer, the term of this patent is extended or adjusted under 35 U.S.C. 154(b) by 128 days.

(21) Appl. No.: 17/175,476

(22) Filed: Feb. 12, 2021

(65) Prior Publication Data

US 2021/0162996 A1  Jun. 3, 2021

Related U.S. Application Data

(63) Continuation of application No. 15/762,528, filed as application No. PCT/US2016/053173 on Sep. 22, 2016, now Pat. No. 10,919,526.

(Continued)

(51) Int. Cl.
*B60W 30/09* (2012.01)
*B60W 30/095* (2012.01)

(Continued)

(52) U.S. Cl.
CPC .... *B60W 30/0953* (2013.01); *B60W 30/0956* (2013.01); *E05B 77/12* (2013.01); *G01S 13/56* (2013.01); *G08G 1/166* (2013.01)

(58) Field of Classification Search
CPC ........... B60W 30/0953; B60W 30/0956; G01S 13/56; G08G 1/166; G08B 23/00; G08B 21/24; G08B 1/08
See application file for complete search history.

(56) References Cited

U.S. PATENT DOCUMENTS 8,816,845 B2 * 8/2014 Hoover ................. B60N 2/26
340/539.11
9,202,316 B1 * 12/2015 Trudell ................. G07C 5/00
(Continued)

FOREIGN PATENT DOCUMENTS

CN 202966134 6/2013
CN 103661093 3/2014
(Continued)

OTHER PUBLICATIONS

Office action and Search Report from Chinese Application No. 2016800570271, English translation and Chinese version), dated Apr. 29, 2020, pp. 1-12.

*Primary Examiner* — Tan Q Nguyen
(74) *Attorney, Agent, or Firm* — Alexander A. Knapp; Kowert, Hood, Munyon, Rankin & Goetzel, P.C.

(57) ABSTRACT

Some embodiments provide a vehicle that includes a protection system configured to mitigate hazards to vehicle occupants posed by dynamic elements located within proximity of the vehicle. The vehicle can, in response to determining that a dynamic element is moving along a trajectory that intersects a sweep volume of a vehicle portal, can selectively restrict operation of the portal so that an occupant is restricted from opening the portal into a volume through which the dynamic element may pass. The vehicle can restrict portal operation in response to detecting external dynamic elements that are not within an occupant's field of vision. The vehicle can communicate a limited selection of vehicle sensor data, including representations of a detected dynamic element, to a user device supporting an authorized user in response to detecting that the dynamic element is located within a certain proximity of the vehicle.

20 Claims, 15 Drawing Sheets

Related U.S. Application Data

(60) Provisional application No. 62/222,721, filed on Sep. 23, 2015.

(51) Int. Cl.

| | | |
|---|---|---|
| *E05B 77/12* | (2014.01) | |
| *G01S 13/56* | (2006.01) | |
| *G08G 1/16* | (2006.01) | |
| *G08B 23/00* | (2006.01) | |

(56) References Cited

U.S. PATENT DOCUMENTS

| | | | | |
|---|---|---|---|---|
| 9,630,496 | B2* | 4/2017 | Cuddihy | ............... B60W 50/14 |
| 9,682,638 | B1* | 6/2017 | McCurdy | ............... B60N 2/002 |
| 9,955,326 | B2* | 4/2018 | Avrahami | ............. G08B 21/24 |
| 10,163,316 | B2* | 12/2018 | Roisen | ................. B60N 2/2821 |
| 10,919,526 | B2 | 2/2021 | Chen et al. | |
| 2007/0018812 | A1* | 1/2007 | Allen | .................. G08B 21/0202 |
| | | | | 340/539.15 |
| 2007/0188312 | A1 | 8/2007 | Bihler et al. | |
| 2010/0060487 | A1 | 3/2010 | Augst | |
| 2011/0175752 | A1 | 7/2011 | Augst | |
| 2011/0196568 | A1 | 8/2011 | Nickolaou et al. | |
| 2012/0050021 | A1* | 3/2012 | Rao | .......................... B60N 2/28 |
| | | | | 340/425.5 |
| 2014/0005860 | A1 | 1/2014 | Chance | |
| 2015/0149088 | A1 | 5/2015 | Attard et al. | |
| 2016/0063865 | A1 | 3/2016 | Flemhmig et al. | |
| 2016/0379466 | A1* | 12/2016 | Payant | ................... G08B 21/22 |
| | | | | 340/457 |

FOREIGN PATENT DOCUMENTS

| | | |
|---|---|---|
| CN | 104574564 | 4/2015 |
| DE | 10-2004062459 | 4/2006 |
| DE | 10-2011010242 | 8/2011 |
| DE | 10-2014223275 | 5/2015 |

\* cited by examiner

DYNAMIC ELEMENT PROTECTION

This application is a continuation of U.S. patent application Ser. No. 15/762,528, filed Mar. 22, 2018, which is a 371 of PCT Application No. PCT/US2016/053173, filed Sep. 22, 2016, which claims benefit of priority to U.S. Provisional Patent Application No. 62/222,721, filed Sep. 23, 2015. The above applications are incorporated herein by reference. To the extent that any material in the incorporated application conflicts with material expressly set forth herein, the material expressly set forth herein controls.

BACKGROUND

Technical Field

This disclosure relates generally to vehicle actions in response to proximate dynamic elements, and in particular to interactions between a vehicle and an individual based on positions and motions of dynamic elements in an external environment proximate to the vehicle.

Description of the Related Art

Vehicles are often navigated through environments in which various elements are located, where vehicles are navigated to avoid collisions with such elements. Elements in an environment can include static elements that do not change location within an environment, including plant life structures, etc. Elements in an environment can include dynamic elements that can change location within an environment, including vehicles, humans, animal life, etc.

In some cases, dynamic elements can pose a hazard to a vehicle, including occupants of the vehicle. For example, a dynamic element can collide with an occupied vehicle. In another example, a dynamic element can pose a hazard to individuals entering and exiting a vehicle interior.

SUMMARY OF EMBODIMENTS

Some embodiments provide a vehicle that includes an ingress/egress portal (e.g., door) configured to mitigate hazards to vehicle occupants posed by dynamic elements located within proximity of the vehicle. The protection module can, in response to determining that a dynamic element is moving along a trajectory that intersects a sweep volume of a vehicle portal, can selectively restrict operation of the portal so that an occupant is restricted from opening the portal into a volume through which the dynamic element may pass. The portal can restrict operation in response to detecting external dynamic elements that are not within an occupant's field of vision. The vehicle can communicate a limited selection of vehicle sensor data, including representations of a detected dynamic element, to a user device supporting an authorized user in response to detecting that the dynamic element is located within a certain proximity of the vehicle.

Some embodiments provide an apparatus that selectively restricts a portal, included in a vehicle, from opening through an entire sweep volume of the portal, based on a determination that a dynamic element located in an environment external to the vehicle is moving along a trajectory that intersects at least a portion of the sweep volume of the portal.

Some embodiments provide a vehicle that includes a portal and a protection system. The portal is configured to be reversibly opened, through a sweep volume of the portal that extends through a portion of an environment external to the vehicle, such that portal selectively enables transit of occupants between an interior of the vehicle and the environment. The protection system is configured to selectively restrict the portal from moving through an entirety of the sweep volume of the portal, based on a determination that a dynamic element located in the environment is moving along a trajectory that intersects at least a portion of the sweep volume of the portal.

Some embodiments provide an apparatus that provides a protection system installable in a vehicle. The apparatus selectively restricts a portal, included in the vehicle, from moving through an entire sweep volume of the portal, based on a determination that a dynamic element located in an environment external to the vehicle is located within a particular proximity distance from one or more portions of the vehicle and is located outside of a determined field of view of at least one occupant of an interior of the vehicle.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1:
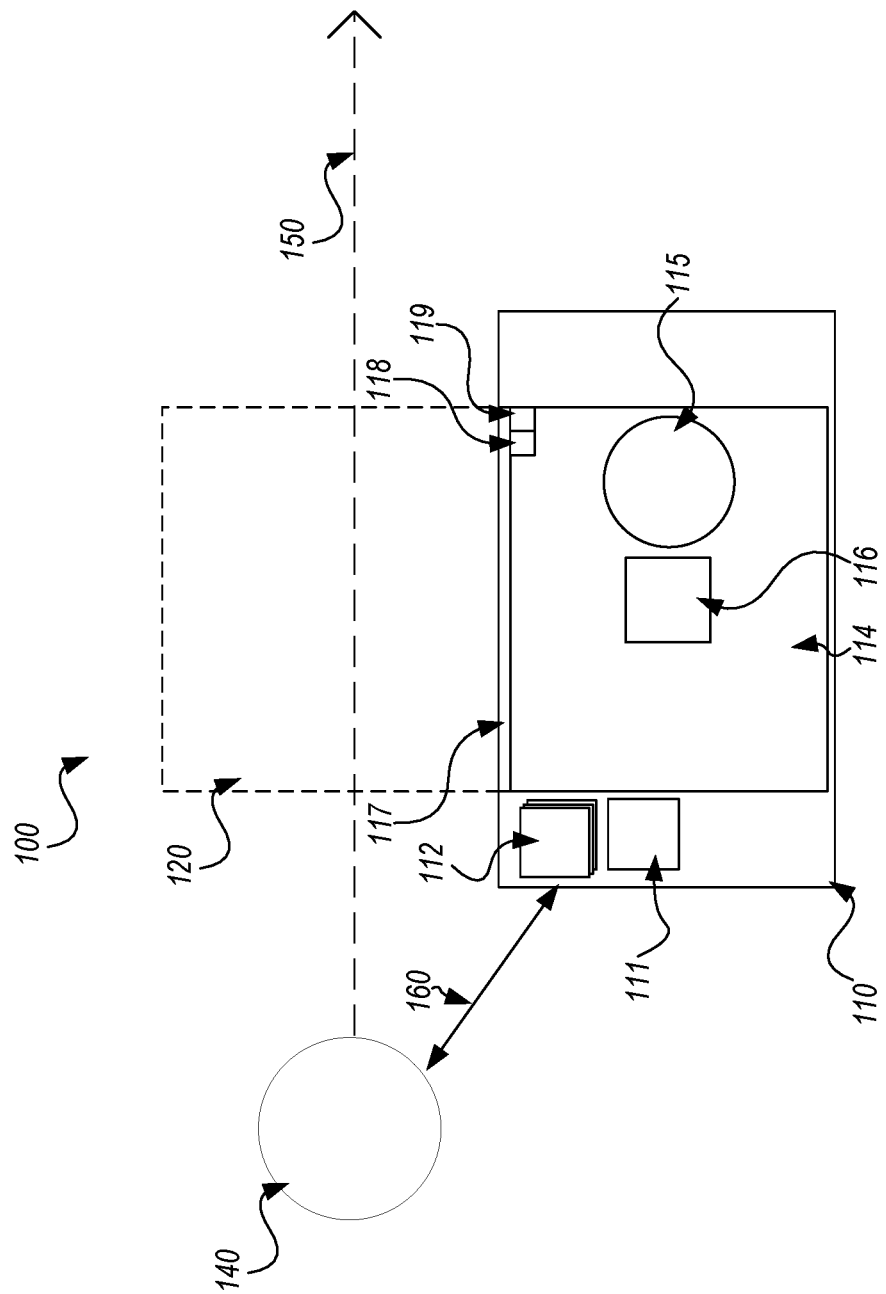
FIG. 1 illustrates a vehicle that restricts vehicle portal movement based on dynamic elements detected in the external environment, according to some embodiments.

FIG. 1 illustrates a vehicle that includes a protection module configured to restrict vehicle portal movement based on dynamic elements detected in the external environment, according to some embodiments.

Vehicle 110 and dynamic element 140 are located in environment 100. Dynamic element 140 can include one or more of a vehicle, pedestrian, animal, some combination thereof, etc. Vehicle 110 can include one or more various vehicles, including an automobile.

As shown, vehicle 110 includes an interior 114 in which a human individual 115 is located. An individual 115 located within an interior 114 of a vehicle 110 is referred to herein as a vehicle occupant 115, occupant 115, etc. Vehicle 110 includes a protection module 111, a set of sensor devices 112, a user interface 116, a vehicle interior portal 117, a portal actuator 118, and a portal latch device 119. The portal 117 can include a door, window, hatch, tailgate, trunk cover (whether front or rear), cargo bed cover, or some combination thereof that can be adjusted to selectively enable or restrict movement of occupant 115 between the interior 114 and the environment 110 external to the vehicle 110.

The actuator 118 can include a mechanism configured to adjustably move the portal 117 through at least a portion of a sweep volume 120 of the portal 107. Such adjustable movement of the portal 117, also referred to as adjusting the position of the portal 117, can include opening the portal from a closed configuration, where the portal 117 restricts occupant 115 movement between interior 114 and environment 100 and where opening the portal from the closed configuration includes moving at least a portion of the portal 117 through at least a portion of the sweep volume 120, so that the at least partially opened portal 117 establishes a conduit between interior 114 and environment 100 via which occupant 115 can move. Such adjustable movement of the portal 117 can include closing the portal from an opened configuration, where the portal 117 enables occupant 115 movement between interior 114 and environment 100 and where closing the portal from the closed configuration includes moving at least a portion of the portal 117 through at least a portion of the sweep volume 120, so that the closed portal 117 restricts movement, by occupant 115 between interior 114 and environment 100.

As referred to herein, as sweep volume 120 of a portal 117 includes a volume of the environment 100, external to the vehicle 110, through which one or more portions of the portal 117 can be moved, adjustably positioned, etc., when the portal is moved between a fully open configuration and a fully closed configuration. Portal 117 movement, also referred to herein as portal 117 operations, can include moving the portal 117 through at least a portion of the sweep volume 120.

The latch device 119 can include one or more of a handle, locking mechanism, etc. via which occupant 115 can interact to open the portal 117, close the portal 117, etc. In some embodiments, the occupant 115 can adjust the position of the portal 117, via interaction with latch device 119, independently of operation of the actuator 118. Similarly, in some embodiments, the actuator 118 can adjust the position of the portal 117 independently of occupant 115 interaction with the latch device 119.

Sensor devices 112 can include various devices that can monitor one or more aspects of the environment 100, including the interior 114 of the vehicle 100. For example, one or more sensor devices 112 can include a camera device, a light beam scanning device, a radar device, some combination thereof, etc.

Protection module 111 can be implemented by one or more computer systems. In some embodiments, protection module interacts with one or more sensor devices 112 to identify ("detect") a dynamic element 140 in the environment 100. Module 111 can, based on the sensor data generated by one or more sensor devices 112 monitoring 160 the dynamic element 140 in the environment 100, determine some or all of a position, velocity, acceleration, etc. of the dynamic element 140 through the environment 100, relative to the vehicle 110. In some embodiments, the module 111 can determine, based on the sensor data, a projected trajectory of the dynamic element through the environment. For example, as shown in FIG. 1, module 111 determines that element 140 is presently moving along a particular trajectory 150 through environment 100.

In some embodiments, protection module 111 selectively controls elements of the vehicle in response to a determination that the dynamic element 140 poses a hazard to moving between the vehicle interior 114 and the environment 100 via portal 117. Such control provides protection to vehicle occupants 115 who may attempt to exit the interior 114 via portal 117, individuals who may attempt to enter the interior 114 via portal 117 etc. when such actions present a risk of a collision between the occupants 115, individuals, etc. with a dynamic element 140 in the environment.

As shown, module 111 can monitor motions, positions, trajectories, etc. of dynamic elements through an environment relative to a portion 120 of the environment through which a portal 117 of the vehicle 100 can move when the portal 117 is adjusted to permit movement of individuals, occupants 115, etc. between environment 100 and interior 114. Such a portion 120 is to associated with a particular corresponding portal 117 and is referred to herein as the sweep volume 120 of portal 117.

In some embodiments, module 111 determines, based on processing sensor data generated by sensor devices 112 monitoring 160 dynamic element 140 through the environment 110, whether a trajectory 150 of the dynamic element 140 passes through a sweep volume 120 of a portal 117 of the vehicle 110, such that the dynamic element 140 is predicted to pass through the volume 120 along trajectory 150 within a certain period of time. In some embodiments, module 111 determines a predicted trajectory 150 of a dynamic element 140 based on one or more of a present position, velocity, acceleration, etc. of the element 140 determined via processing of sensor data generated by one or more sensor devices 112. In some embodiments, one or more of the sensor devices includes a communication transceiver that is operatively coupled to and configured to communicate with one or more portions of the dynamic element 140, and module 111 can determine trajectory 150 based on navigation data received from element 140 based on such communication. For example, element 140 can include a vehicle navigating through environment, and module 111 can determine trajectory 150 based on communication with a navigation computer system of the vehicle 110 via an interface included in a sensor 112.

The dimensions, boundaries, etc. of a sweep volume 120 of a portal 117 can be stored locally to vehicle 100 and accessed by module 111 in determining whether trajectory 150 intersects with a sweep volume 120.

In some embodiments, module 111, in response to a determination that a dynamic element 140 trajectory 150 intersects a sweep volume 120 of a portal 117, controls various elements of the vehicle 100 to cause the portal 117 to be restricted from being adjusted to permit occupant 115 movement from interior 114 to environment 100, thereby mitigating a hazard of dynamic element 140 colliding with one or more of the portal 117, the occupant 115, etc. Such restriction includes restricting movement of the portal, so that the portal 117 is at least partially restricted from being moved, via one or more of elements 118, 119, through some or all of the sweep volume 120 of the portal 117. For example, based on a determination that trajectory 150 intersects the sweep volume 120 of portal 117, module 111 can command actuator 118 to be inhibited from adjusting a position of the portal 117 from a closed configuration, command latch device 119 to be inhibited from adjusting the portal 117 from a closed configuration based on occupant 115 interaction with the latch device 119, some combination thereof, etc. As a result, in some embodiments, module 111 can control elements 118, 119 to cause portal 117 to be restricted from being moved from a closed to configuration. Such control can include controlling a lock mechanism included in the latch device 119 to be engaged, such that the portal is "locked" and manually-initiated control of the position of the portal, manually-initiated movement of the portal, some combination thereof, etc. is inhibited. In some embodiments, the portal may be restricted in regard to movement by either an internal occupant or an external actor.

In some embodiments, module 111, in response to a determination that a dynamic element 140 trajectory 150 intersects a sweep volume 120 of a portal 117, generates a warning prompt, which can be provided to occupant 115 via an interface 116 included in the vehicle 110, to alert the occupant 115 to a risk of dynamic element 140 moving along a trajectory 150 that intersects sweep volume 120 and thus presenting a risk of collision with one or more of portal 117 or occupant 115 if the occupant 115 opens the portal 117 within a certain period of time during which element 140 moves along trajectory 150 through sweep volume 120. In some embodiments, the prompt comprises one or more of an audio signal, an audio message, a visual indication, a graphical message, etc.

As used herein, the word "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, the module 111 disables restrictions upon operation of the portal 117, thereby enabling occupant 115 to move the portal 117, based on receiving an occupant-initiated override command. In some embodiments, the override command can be generated based on occupant 115 interaction with an interface 116 included in the vehicle 110. For example, a warning prompt provided to occupant 115 via interface 116 can include an option for the occupant to disable module 111-commanded restrictions on portal 117 operation, and module 111 can control one or more of elements 118, 119 to disable restrictions on portal operation 117 based on occupant 115 interaction with the option. In some embodiments, the override command can be generated based on occupant 115 interacting with latch device 119. For example, where module 111 controls latch device 119 to restrict control of the mechanism 119 over adjustment of the portal 117 based on occupant interaction, the module 111 can release control of the latch device 119, so that latch device controls adjustment of the portal 117 based on occupant interaction with latch device 119, based on occupant 115 interacting with latch device 119 more than a threshold quantity of interactions after the module 111 controls the latch device 119 to restrict control, after the module 111 provides a warning prompt to occupant 115 via interface 116, some combination thereof, etc.

In some embodiments, module 111 selectively restricts operation of portal 117 based on a determination of whether occupant 115 is likely, above a certain probability threshold level, to operate portal 117 to enable occupant movement between interior 114 and environment 110. For example, one or more sensor devices 112 can include interior sensors that can monitor motions, facial positions, etc. of the occupant 115 and module 111 can determine, based on processing the sensor data generated by interior sensors, a likelihood that occupant 115 will operate the particular portal 117 within a certain period of time during which element 140 may pass through volume 120 along trajectory 150. Portal operation by an occupant includes manually-initiated control of one or more of portal 117, elements 118, 119, etc. that causes the portal 117 to be moved, adjustably positioned, etc. through at least some of the sweep volume 120 of portal 117. A likelihood can comprise a determined probability value that the occupant (or, in some embodiments, an external actor) will operate the portal, wherein operating the portal comprises opening the portal through at least a portion of the sweep volume of the portal.

In some embodiments, where the occupant 115 is determined to be likely to not operate portal 117, operate a different portal associated with a different sweep volume through which a dynamic element trajectory does not pass, etc., module 111 can refrain from one or more of providing a warning prompt to occupant 115 via interface 116, controlling one or more of elements 118, 119 to cause portal 117 operation to be at least partially restricted, etc. In some embodiments, module 111 determines whether occupant 115 is likely to operate portal 117 based on a present position, velocity, etc. of the vehicle 110. For example, one or more sensors devices 112 can include vehicle sensors, including speedometers, wheel rotation sensors, geopositioning sensors, etc. and module 111 can determine that, based on a determination that vehicle 110 is in motion above a certain threshold velocity, is located in a certain location, etc. that occupant 115 is unlikely to operate portal 117. For example, where module 111 determines that vehicle 110 is stopped at a roadway intersection and dynamic element 140 is moving along trajectory 150, module 111 can determine that occupant 115 is unlikely to operate portal 117 and can refrain from providing a prompt through interface 116, controlling one or more of elements 118, 119 to restrict operation of the portal 117, etc. In another example, where module 111 determines that vehicle 110 is stopped in a parking spot in a parking lot, module 111 can determine that occupant 115 is likely to operate portal 117 and can, in response, provide a prompt through interface 116, control one or more of elements 118, 119 to restrict operation of the portal 117, etc.

Figure 2:
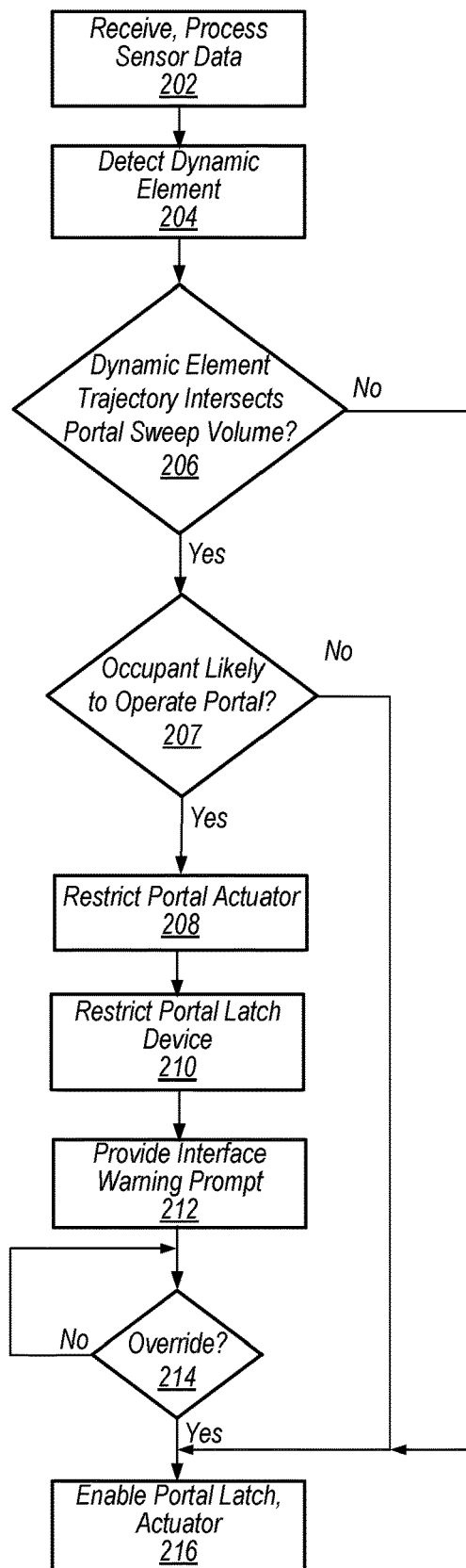
FIG. 2 illustrates controlling portal movement based on detection of dynamic elements in an external environment, according to some embodiments.

FIG. 2 illustrates controlling portal movement based on detection of dynamic elements in an external environment, according to some embodiments. The discussions herein pertaining to an occupant may, in some embodiments, additionally or alternatively apply to an external actor. The controlling can be implemented by any of the embodiments of protection modules included herein. A protection module can be implemented by one or more computer systems.

At 202, one or more instances of sensor data generated by one or more sensor devices included in a vehicle are received and processed. At 204, based on processing the received sensor data, a dynamic element is detected in the external environment in which the vehicle is located, where detection of the dynamic element includes determining one or more of a present position, velocity, acceleration, etc. of the dynamic element through the environment.

At 206 and 207, a determination is made regarding whether a predicted trajectory of the dynamic element, which can be determined based on one or more of a determined position, velocity, acceleration, etc. of the dynamic element through the environment, intersects one or more particular sweep volumes of one or more particular portals of the vehicle, and a further determination is made regarding whether an occupant of the vehicle is likely to operate the one or more particular portals of the vehicle. If so, as shown, at 208 and 210, the portal actuator and latch devices are commanded to restrict movement of the particular portal, so that operation of the portal that would result in the portal being moved through the sweep volume is restricted. In addition, as shown at 212 a warning prompt is generated, which can be provided through an interface and includes an indication, to an occupant of the vehicle, that the dynamic element poses a hazard if the portal were operated. In some embodiments, the prompt includes an override interface element via which an occupant can interact to provide an override command.

At 214, a determination is made regarding whether an override command is received. If so, at 216, restriction of the portal via control of the portal latch device and actuator is released, so that the occupant can operate the portal via operation of one or more of the latch device or the actuator.

Figure 3:
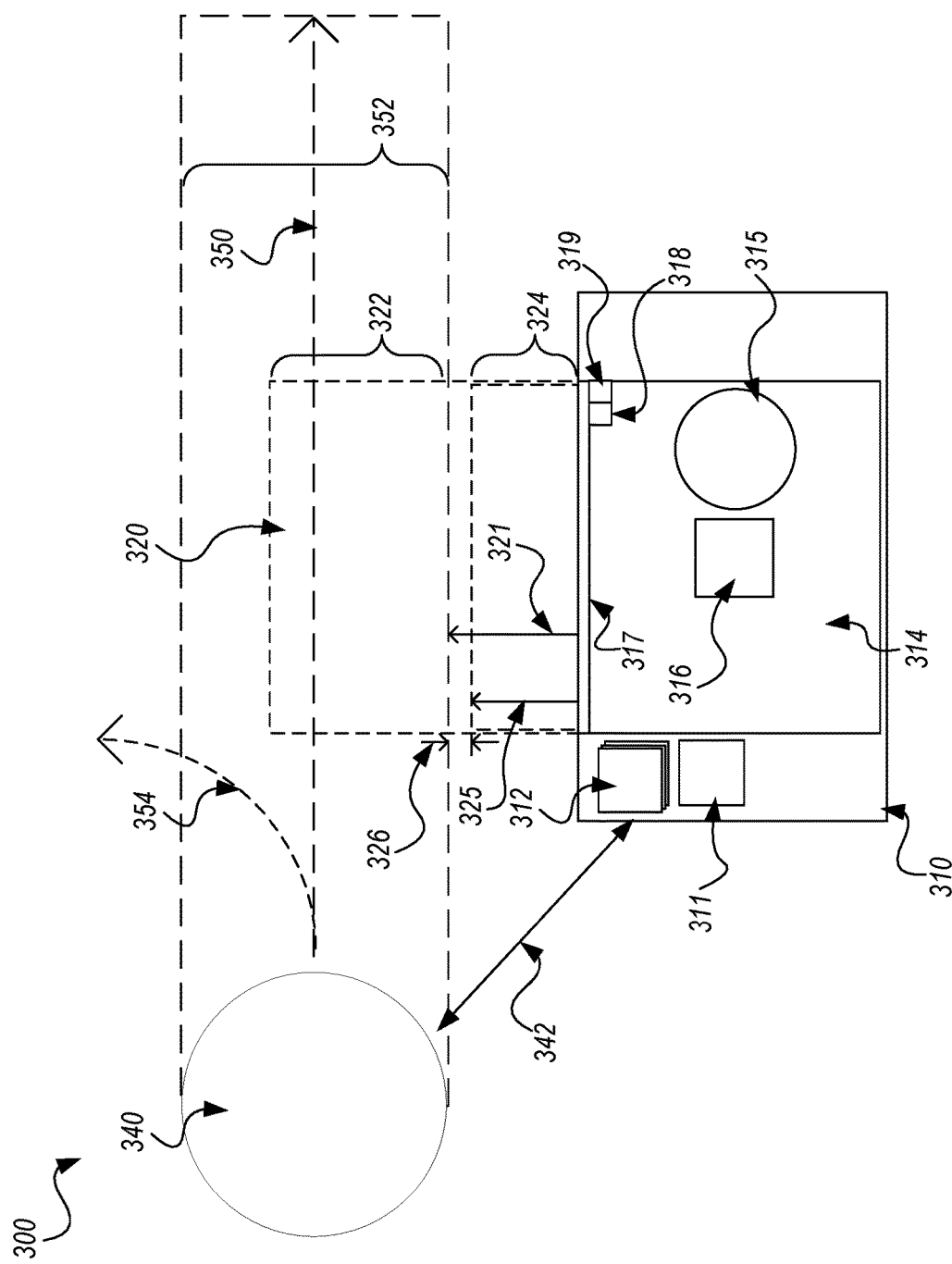
FIG. 3 illustrates a vehicle that restricts vehicle portal movement based on dynamic elements detected in the external environment, according to some embodiments.

FIG. 3 illustrates a vehicle that includes a protection module configured to restrict vehicle portal movement based on dynamic elements detected in the external environment, according to some embodiments. The vehicle 310 illustrated in FIG. 3 can include any of the embodiments of vehicles included herein, including vehicle 110 illustrated in FIG. 1. The protection module 311 illustrated in FIG. 3 can include any of the embodiments of protection modules included herein, including module 111 illustrated in FIG. 1.

Vehicle 310, located in a common environment 300 with dynamic element 340, includes a set of sensor devices 312, a protection module 311, an interior 314, an interface 316, a portal 317, and a portal actuator 318 and latch device 319. An occupant 315 is located in the interior 314. A sweep volume 320 is associated with portal 317.

In some embodiments, a protection module determines a particular portion of a portal sweep volume that is overlapped by a trajectory volume through which a dynamic element, moving along a trajectory through the environment, can occupy at one or more times during such movement. As shown in the illustrated embodiment, protection module 311 can determine, based on sensor data generated by sensor devices 312 monitoring 342 element 340, that element 340 is determined to be moving through environment 300 along trajectory 350. In addition, based on the sensor data, module 311 can determine one or more various spatial dimensions of the dynamic element 340 and can further determine, based on the trajectory 350 and the determined spatial dimensions of element 340, a trajectory volume 352 representing a volume through which one or more portions of element 340 passes when element 340 moves along trajectory 350. As shown in FIG. 3, module 311 can determine that the trajectory volume 352 overlaps a particular portion 322 of the sweep volume 320 of portal 317.

In some embodiments, a protection module, in response to determining that a trajectory volume of a dynamic element overlaps a portion of the sweep volume of a particular portal, selectively and adjustably controls operation of the particular portal to restrict movement of the portal to movement through a limited portion of the sweep volume. The limited portion of the sweep volume can include a portion of the sweep volume that is not overlapped by a dynamic element trajectory volume and can include a portion that is removed from the overlapped portion of the sweep volume by a particular margin distance. As a result, the protection module can restrict the portal from moving through a portion of the sweep volume that overlaps with a trajectory volume of a dynamic element, thereby mitigating a risk of a collision between the dynamic element and the portal while permitting at least some movement of occupants, individuals, etc. between the vehicle interior and the environment external to the vehicle.

As shown in FIG. 3, module 311 can control operation of portal 317 via control of one or more of elements 318, 319, to cause the portal 317 to be restricted in motion so that the portal 317 is restricted to moving within a limited portion 324 of the sweep volume 320. The limited portion 324 can be determined at the module 311 as a portion of volume 320 that extends a certain distance 325 that is a limited portion of the full distance 321 to the overlapped portion 322, where the difference 326 represents a predetermined safety margin distance. The safety margin distance can be based at least in part upon a fixed distance, a proportion of the distance 321, one or more scanned 342 aspects of the dynamic element 340, some combination thereof, etc. The control can include permitting the portal 317 to move through portion 324 and commanding one or more elements 318, 319 to restrict further motion of the portal 317 beyond volume portion 324 based on a determination that one or more portions of the portal 317 is positioned within a certain proximity 326 of the overlapped portion 322 of the volume 320.

In some embodiments, module 311 can provide, to occupant 315 via interface 316, an indication that portal 317 operation is restricted in that movement of the portal is restricted to the limited portion 324 of the sweep volume 320. In some embodiments, module 311 can release the restriction of portal 317 operation, such that module 311 enables portal 317 to move through the full sweep volume 320, based on an occupant-initiated override command received at module 311.

In some embodiments, module 311, in response to determining that dynamic element 340 is moving along a trajectory 350 that intersects the sweep volume 320, communicates with dynamic element 340 and provides, to element 340, an indication that element 340 is approaching a volume 320 through which portal 317 is likely to be moved by an occupant 115 of the vehicle. In some embodiments, the communication can include module 311 requesting dynamic element 340 to move along a diversion trajectory 354 in order to avoid the sweep volume 320.

Figure 4:
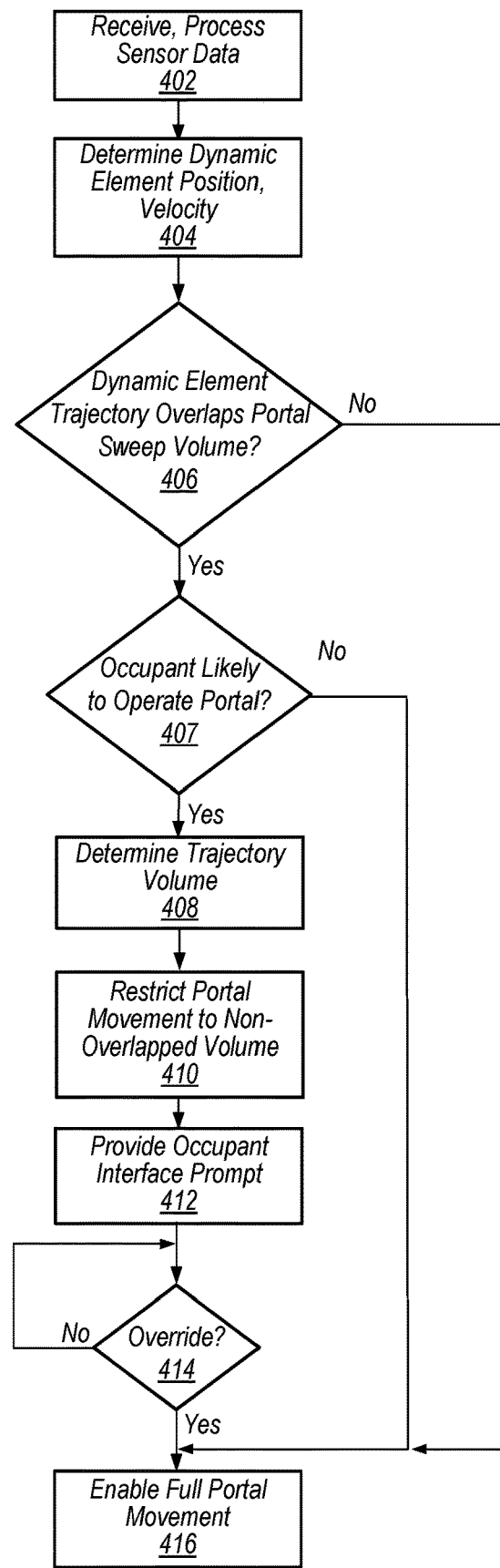
FIG. 4 illustrates controlling portal movement based on detection of dynamic elements in an external environment, according to some embodiments.

FIG. 4 illustrates controlling portal movement based on detection of dynamic elements in an external environment, according to some embodiments. The controlling can be implemented by any of the embodiments of protection modules included herein. A protection module can be implemented by one or more computer systems.

At 402, one or more instances of sensor data generated by one or more sensor devices included in a vehicle are received and processed. At 404, based on the processing, a dynamic element is detected in the external environment in which the vehicle is located, where detection of the dynamic element includes determining one or more of a present position, velocity, acceleration, etc. of the dynamic element through the environment.

At 406 and 407, a determination is made regarding whether a predicted trajectory of the dynamic element, which can be determined based on one or more of a determined position, velocity, acceleration, etc. of the dynamic element through the environment, overlaps one or more portions of one or more particular sweep volumes of one or more particular portals of the vehicle, and a further determination is made regarding whether an occupant of the vehicle is likely to operate the one or more particular portals of the vehicle. If so, as shown, at 408 and 410, the portal actuator and latch devices are commanded to be at least partially restricted, so that operation of the portal that would result in the portal being moved through the sweep volume is restricted to cause the portal to be restricted to moving within a determined limited portion of the sweep volume that is not overlapped by the dynamic element trajectory volume. The restriction can include controlling the portal actuator to restrict the portal from being moved beyond the limited portion of the sweep volume. In addition, as shown at 412 a warning prompt is generated, which can be provided through an interface and includes an indication, to an occupant of the vehicle, that the dynamic element poses a hazard if the portal were operated. In some embodiments, the prompt includes an override interface element via which an occupant can interact to provide an override command.

At 414, a determination is made regarding whether an override command is received. If so, at 416, restriction of portal movement via control of the portal latch device and actuator is released, so that the occupant can operate the portal, via operation of one or more of the latch device or the actuator, to cause the portal to be moved through the full sweep volume of the portal.

Figure 5:
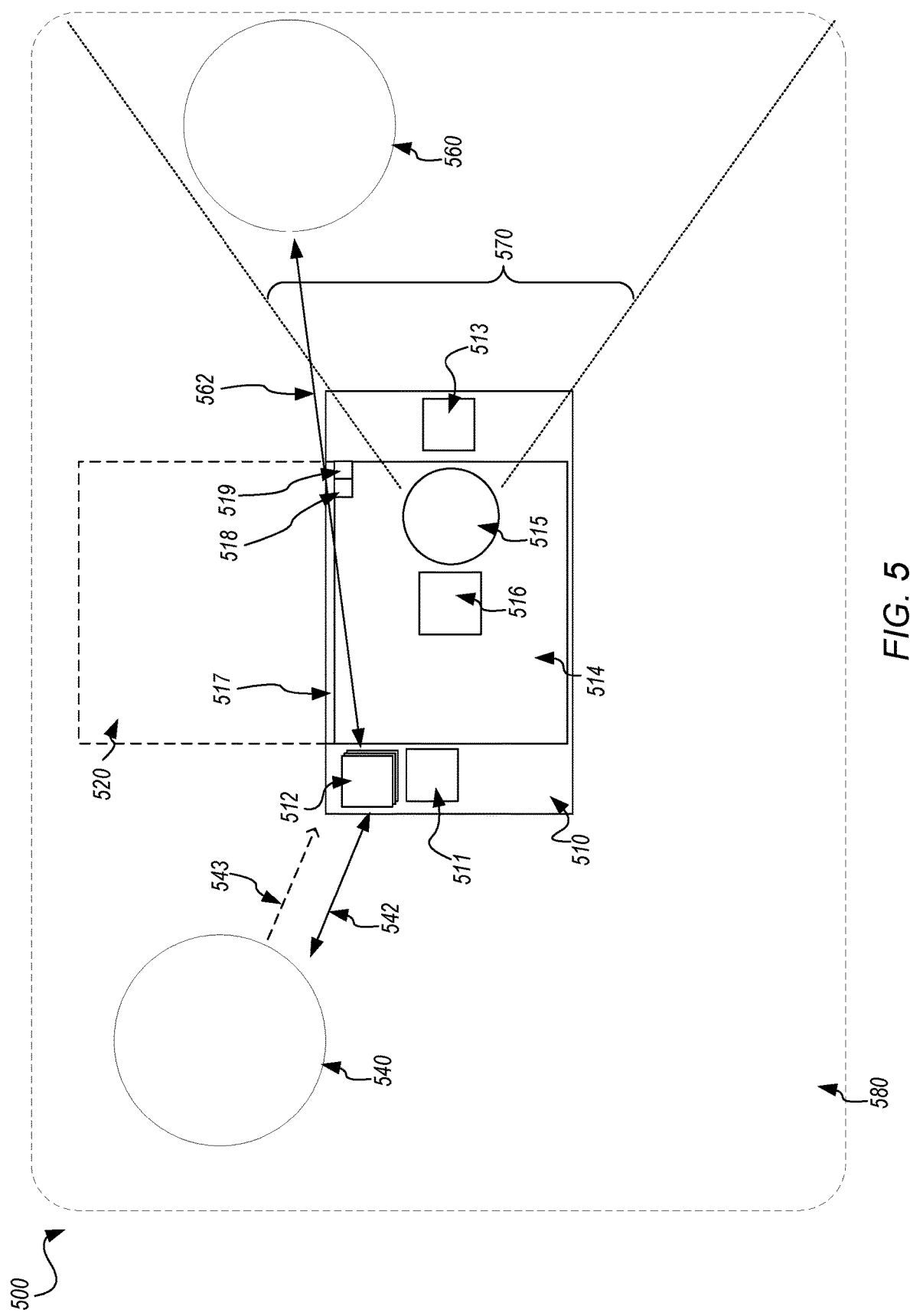
FIG. 5 illustrates a vehicle that adjustably restricts vehicle portal movement based on dynamic elements detected in the external environment, according to some embodiments.

FIG. 5 illustrates a vehicle that includes a protection module configured to adjustably restrict vehicle portal movement based on dynamic elements detected in the external environment, according to some embodiments. The vehicle 510 illustrated in FIG. 5 can include any of the embodiments of vehicles included herein, including vehicle 110 illustrated in FIG. 1. The protection module 511 illustrated in FIG. 5 can include any of the embodiments of protection modules included herein, including module 111 illustrated in FIG. 1.

Vehicle 510, located in a common environment 500 with dynamic elements 540 and 560, includes a set of sensor devices 512 and 513, a protection module 511, an interior 514, an interface 516, a portal 517, and a portal actuator 518 and latch device 519. An occupant 515 is located in the interior 514. A sweep volume 520 is associated with portal 517.

In some embodiments, a protection module restricts operation of one or more portals in a vehicle based at least in part upon determining that a dynamic element is located within a particular proximity distance from one or more portions of the vehicle and the one or more portals. The protection module can restrict operation of a portal based on a determination that a dynamic element is moving towards one or more of the vehicle, portal, portal sweep volume, etc.

A dynamic element within a particular proximity distance from one or more portions of the vehicle, a particular proximity region that extends from one or more portions of the vehicle into an environment external to the vehicle, etc. can pose a potential hazard to an occupant of the vehicle when the occupant exits the vehicle interior via a portal of the vehicle. For example, where a dynamic element 540 in the environment 500 is a pedestrian that is loitering within a proximity distance from the vehicle 510, a proximity region extending from the vehicle 510, etc., the pedestrian 540 may potentially pose a safety hazard to occupant 515 if the occupant exits the vehicle interior 514. As a result, restricting portal operation based on a detected dynamic element that is within a proximity distance from the vehicle 510, a proximity region extending from the vehicle 510, etc. can augment the safety of an occupant of the vehicle. A proximity region extending from a vehicle into an environment can be referred to herein as a proximity region of the vehicle, a proximity region associated with the vehicle, etc.

In some embodiments, the protection module selectively restricts portal operation based on one or more of a present position, velocity, acceleration, etc. of a detected dynamic element. In the illustrated embodiment, protection module 511 monitors dynamic elements 540, 560 located within a certain proximity region 580 of the vehicle 510, via sensor data generated by sensor devices 512 monitoring 542, 562 the dynamic elements. As shown, protection module 511 can determine that both dynamic elements 540, 560 are located within the proximity region 580. In some embodiments, module 511 controls one or more portions of the vehicle 510, including one or more of elements 518, 519, to restrict operation of portal 517 to cause the portal 517 to be restricted from moving through volume 520 to enable occupant 515 to move from interior 514 to environment 500, based on a determination that at least one of the dynamic elements 540, 560 is located within proximity region 580.

In some embodiments, module 511 monitors a present velocity of the dynamic elements 540, 560 via sensor devices 512 and controls one or more portions of the vehicle 510, including one or more of elements 518, 519, to restrict portal 517 from moving through volume 520, based on a determination that dynamic element 540 is moving along a trajectory 543 that approaches the vehicle 510. Although trajectory 543 may not intersect sweep volume 520, module 511 can restrict operation of portal 517 based on a determination that element 540 is within region 580 and is moving along a trajectory 543 that approaches vehicle 510.

In another example, module 511 can restrict operation of portal 517 based on a determination that dynamic element 560 is located within region 580 and is stopped in the to environment, such that the element 560 is determined to be loitering within region 580.

In some embodiments, the protection module monitors a field of view of an occupant that is determined likely to operate a portal and selectively restricts operation of a portal based on whether a dynamic element that is located within a proximity region is located beyond the determined field of view of the occupant. In some embodiments, the field of view may be determined based on an available field of view from the interior at the portal. In other embodiments, the field of view may be determined based, at least in part, on camera or other sensor data indicating the occupants head position or direction of vision, for example. In the illustrated embodiment, vehicle 510 includes an interior sensor 513, which can include a camera device and which can monitor one or more aspects of occupant 515. Module 511 can determine, based on sensor data generated by sensor 513 that monitors occupant 515, a field of view 570 of the occupant 515. Module 511 can further determine that the detected dynamic element 560, which is stopped within region 580 is also located within the field of view of occupant. For example, where dynamic element 540 is absent, module 511 can refrain from restricting portal 517 operation based on dynamic element 560 which is stopped within region 580, based on the determination that element 560 is within field of view 570. In another example, where dynamic element 540 is present and element 560 is absent, module 511 can restrict portal 517 operation based at least in part upon the determination that dynamic element 540, located in region 580, is outside the determined occupant 515 field of view 570.

Because an occupant may be more suited to determining whether a dynamic element poses a hazard, module 511, by accounting for whether the dynamic element is within the occupant's field of view, defers to occupant judgment regarding whether to operate the portal when the dynamic element is within the field of view. In contrast, where a dynamic element is not within the occupant's field of view, module 511 provides protection to the occupant by accounting for a dynamic element of which the occupant may be unaware.

In some embodiments, module 511, based on restricting portal operation based on detection of a dynamic element within the proximity region, provides an indication, to occupant 515 via interface 516, of the presence of the detected dynamic element. The occupant 515 can then choose to provide an override command to module 511, upon which the module 511 releases restrictions on portal 517 operations.

Figure 6:
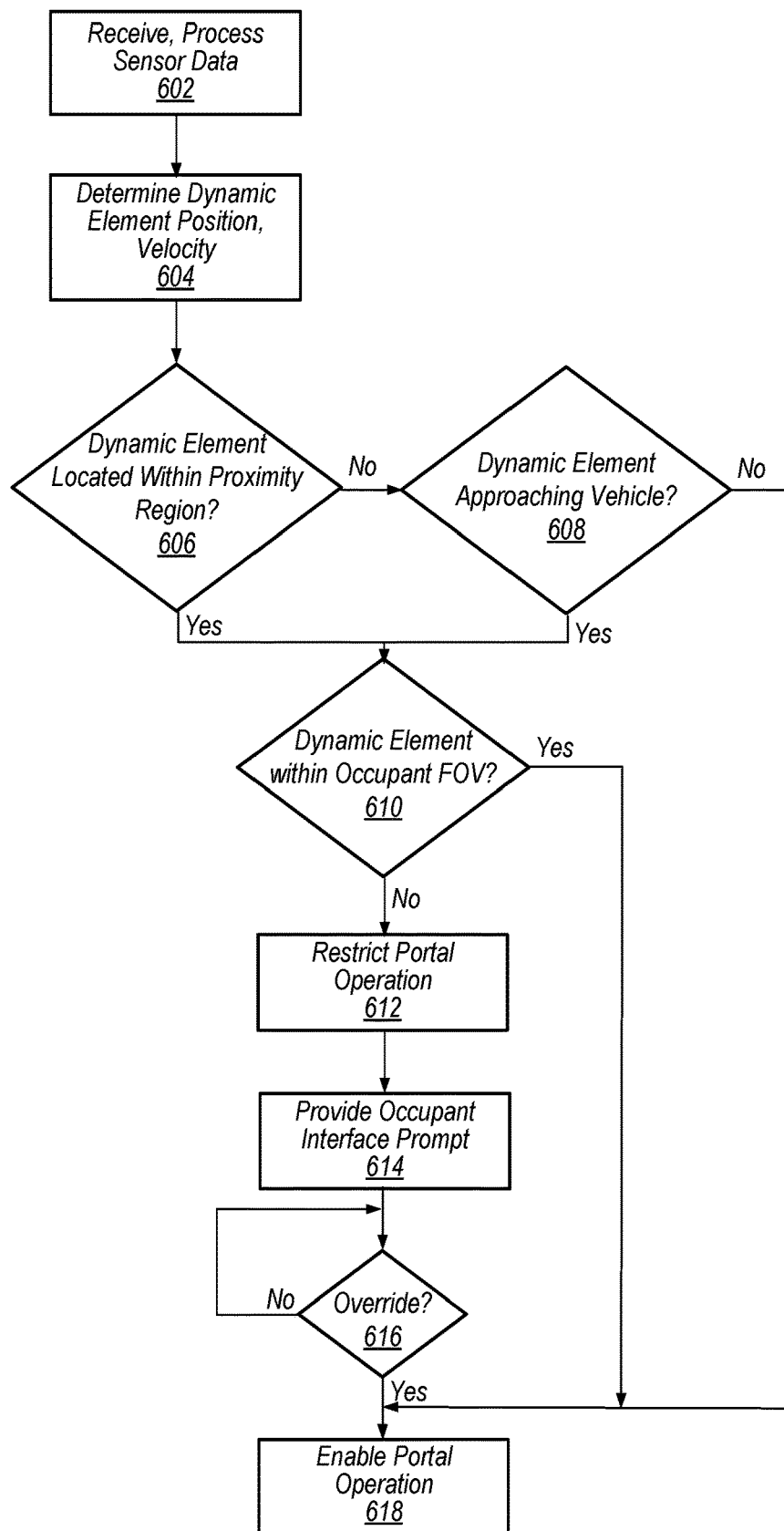
FIG. 6 illustrates controlling portal movement based on detection of dynamic elements in an external environment, according to some embodiments.

FIG. 6 illustrates controlling portal movement based on detection of dynamic elements in an external environment, according to some embodiments. The controlling can be implemented by any of the embodiments of protection modules included herein. A protection module can be implemented by one or more computer systems.

At 602, one or more instances of sensor data generated by one or more sensor devices included in a vehicle are received and processed. At 604, based on the processing, a dynamic element is detected in the external environment in which the vehicle is located, where detection of the dynamic element includes determining one or more of a present position, velocity, acceleration, etc. of the dynamic element through the environment.

At 606 and 608, a determination is made regarding whether the detected dynamic element, which can be determined based on one or more of a determined position, velocity, acceleration, etc. of the dynamic element through the environment, is located within a certain proximity region associated with one or more of the vehicle, of one or more particular portals of the vehicle, etc., and a further determination is made regarding whether the dynamic element is moving along a trajectory that approaches the vehicle. If so, as shown, at 610, a determination is made regarding whether the dynamic element is located within a field of view of an occupant that is determined to be likely to operate one or more particular portals of the vehicle. An occupant can be determined to be likely to operate a portal based on proximity of the occupant to the portal, whether one or more aspects of the portal, including a latch device of the portal, is located with a field of view of the occupant, some combination thereof, etc.

At 612, if the dynamic element is not within a field of view of an occupant determined likely to operate a particular portal, operation of the particular portal is restricted to restrict the portal from moving through a sweep volume. In addition, as shown at 614, a warning prompt is generated and can be provided through an interface and includes an indication, to an occupant of the vehicle, that a dynamic element is detected that poses a hazard if the portal were operated. In some embodiments, the prompt includes an override interface element via which an occupant can interact to provide an override command.

At 616, a determination is made regarding whether an override command is received. If so, at 618, a restriction on operation of the portal via control of the portal latch device and actuator is released, so that the occupant can operate the portal, via operation of one or more of the latch device or the actuator, to cause the portal to be opened through the sweep volume of the portal and enable one or more occupants to move between the vehicle interior and the environment via the opened portal.

Figure 7:
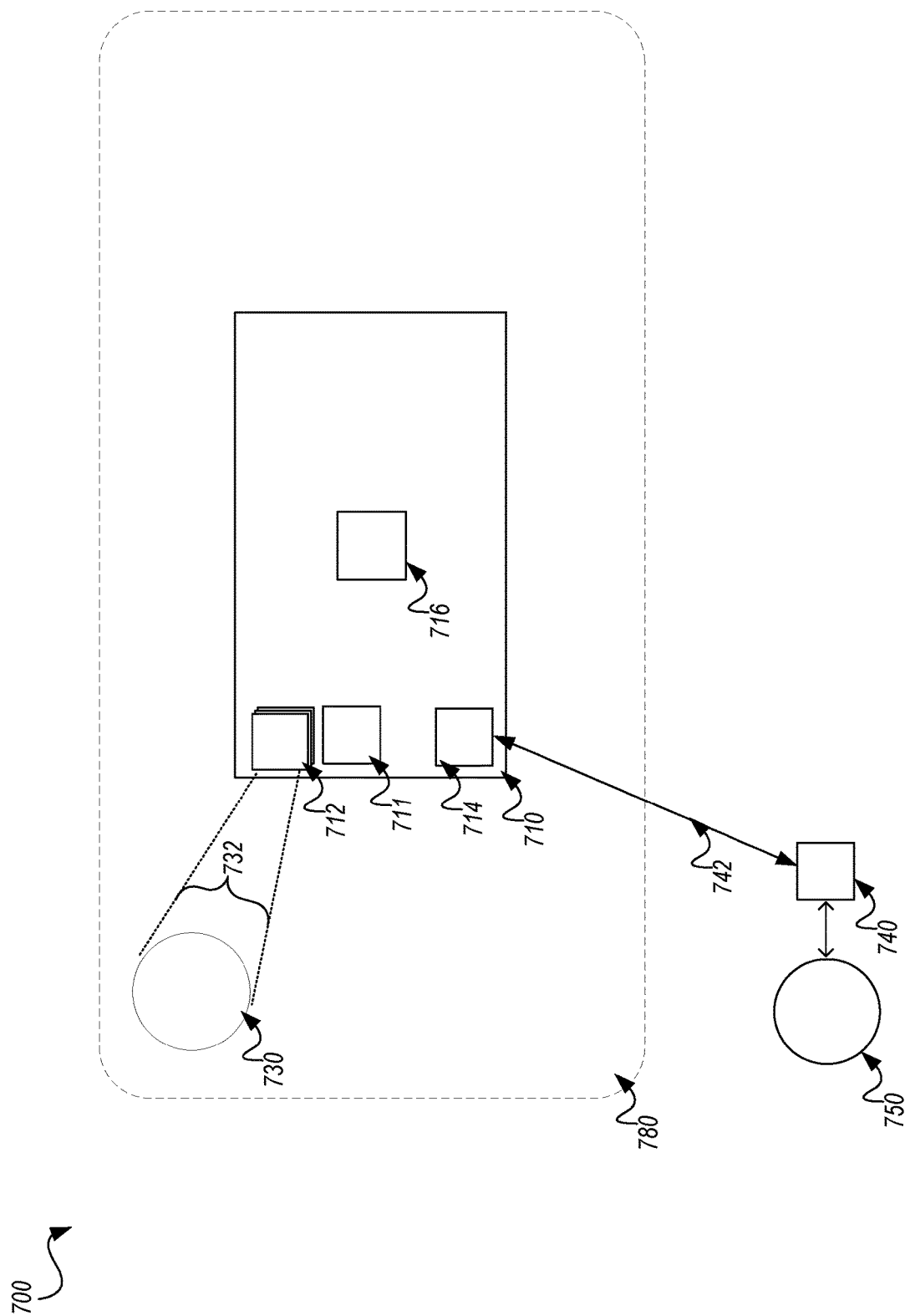
FIG. 7 illustrates a vehicle that communicates selected data to a user device supporting a particular user based on dynamic elements detected in the external environment, according to some embodiments.

FIG. 7 illustrates a vehicle that includes a protection module configured to communicate selected data to a user device supporting a particular user based on dynamic elements detected in the external environment, according to some embodiments. The vehicle 710 illustrated in FIG. 7 can include any of the embodiments of vehicles included herein, including vehicle 110 illustrated in FIG. 1. The protection module 711 illustrated in FIG. 7 can include any of the embodiments of protection modules included herein, including module 111 illustrated in FIG. 1.

Vehicle 710, located in a common environment 700 with dynamic element 730, includes a set of sensor devices 712, a protection module 711, a communication interface 714, and a set of functional mechanisms 716. An individual 750 associated with the vehicle 710 is located externally to the vehicle 710 and is supported by a user device 740 which is communicatively coupled to the vehicle 710 via a communication link with interface 714. The communication link can include a two-way communication link established via one or more communication networks.

In some embodiments, a protection module included in a vehicle is configured to, in response to detection of a dynamic element within a particular proximity distance from the vehicle, a particular proximity region of the vehicle, etc. in the absence of a certain authorized individual being located within the vehicle, communicate information regarding the detected dynamic element to a user device that supports the authorized individual. The communicated information can include a limited selection of sensor data generated by sensor devices in the vehicle, where the limited selection includes sensor data associated with the detected dynamic element, including images, point clouds, etc. of the dynamic element captured by sensor devices included in the vehicle.

In the illustrated embodiment, a dynamic element 730 is located within a certain proximity region 780 associated with vehicle 710 when an authorized individual 750 associated with the vehicle 710 is external to the vehicle. The authorized individual 750 can be a registered user of the vehicle 710. The module 711 detects the dynamic element 730 based on processing sensor data generated by sensors 712 and can determine that dynamic element 730 is located within region 780. Based on the determination, module 711 can generate a warning prompt that is communicated to the user device 740 supporting the authorized individual 750 via link 742. The warning prompt can include an indication that a dynamic element is detected within a proximity region 780 of vehicle 710.

In some embodiments, module 711 communicates a limited selection of sensor data associated with the detected dynamic element 730, including one or more captured images within a field of view 730 of one or more sensors 712 that encompasses a limited portion of environment 700 that includes dynamic element 730. In some embodiments, the sensor data communicated to user device 740 via link 742 includes a continuous streaming sensor data, including a streaming video of the dynamic element 730. The captured field of view 732 of sensor data communicated to device 740 can be adjusted over time so that the field of view 732 encompasses the dynamic element 730 as the element 730 moves through region 780. The field of view 732 can, in some embodiments, including a smallest field of view 732 that encompasses the detected dynamic element 730 and can include a limited selection of sensor data generated by sensor devices 712.

In some embodiments, module 711 generates a warning prompt and communicates sensor data to user device 740 based on a determination that dynamic element 730 is both located in region 780 and is moving at less than a threshold velocity, is located within region 780 more than a threshold period of elapsed time, some combination thereof, etc. For example, where element 730 is stopped within region 780 for more than a certain period of time, module 711 can respond by generating the warning prompt to user device 740 via link 742 and communicating a limited selection of sensor data, including images of element 730 within field of view 732 to device 740 via link 742.

In some embodiments, a warning prompt communicated to device 740 includes an invitation to the authorized individual 750 supported by device 740 to command one or more actions to be performed by one or more functional mechanisms 716 of the vehicle 710 via interaction with an interface provided by device 740. For example, where a functional mechanism 716 includes an audio speaker, noisemaker device, etc., the prompt can include an invitation to command the mechanism 716 to activate, thereby providing an audio warning signal to dynamic element 730. Module 711, in some embodiments, controls one or more functional mechanisms 716 of vehicle 710 based on an individual 750-initiated command received from device 740 via link 742.

In some embodiments, module 711 determines to communicate with a particular user device 740 supporting a particular authorized user 750 based on determining, via comparing sensor data representations of an interior of the vehicle with a set of authorized user data that includes data via which module 711 can identify a presence of an authorized user in the vehicle interior, that one or more authorized users are absent from the vehicle interior. The module 711 can, based on determining an absence of one or more authorized users from the vehicle interior, identify a user device supporting the authorized user via accessing a database that associates an authorized user profile, associated with the authorized user, with user device information that identifies a particular user device. Based on identifying the user device, the module 711 can establish a communication link with the identified user device and communicate sensor data and warning prompts to the user device via the link.

Users can benefit from use of personal data, which can include data associated with a user profile. For example, the personal data can be used to communicate data associated with a vehicle to a particular user via an associated user device, and execute functions based on communication from a user device supporting an authorized user. Accordingly, use of such personal data enables remotely-located users to receive information associated with a vehicle, including information regarding proximate dynamic elements, indications of collisions, indications of occupancy and climate conditions within the vehicle, some combination thereof, etc.

Users, which can include occupants, can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

Figure 8:
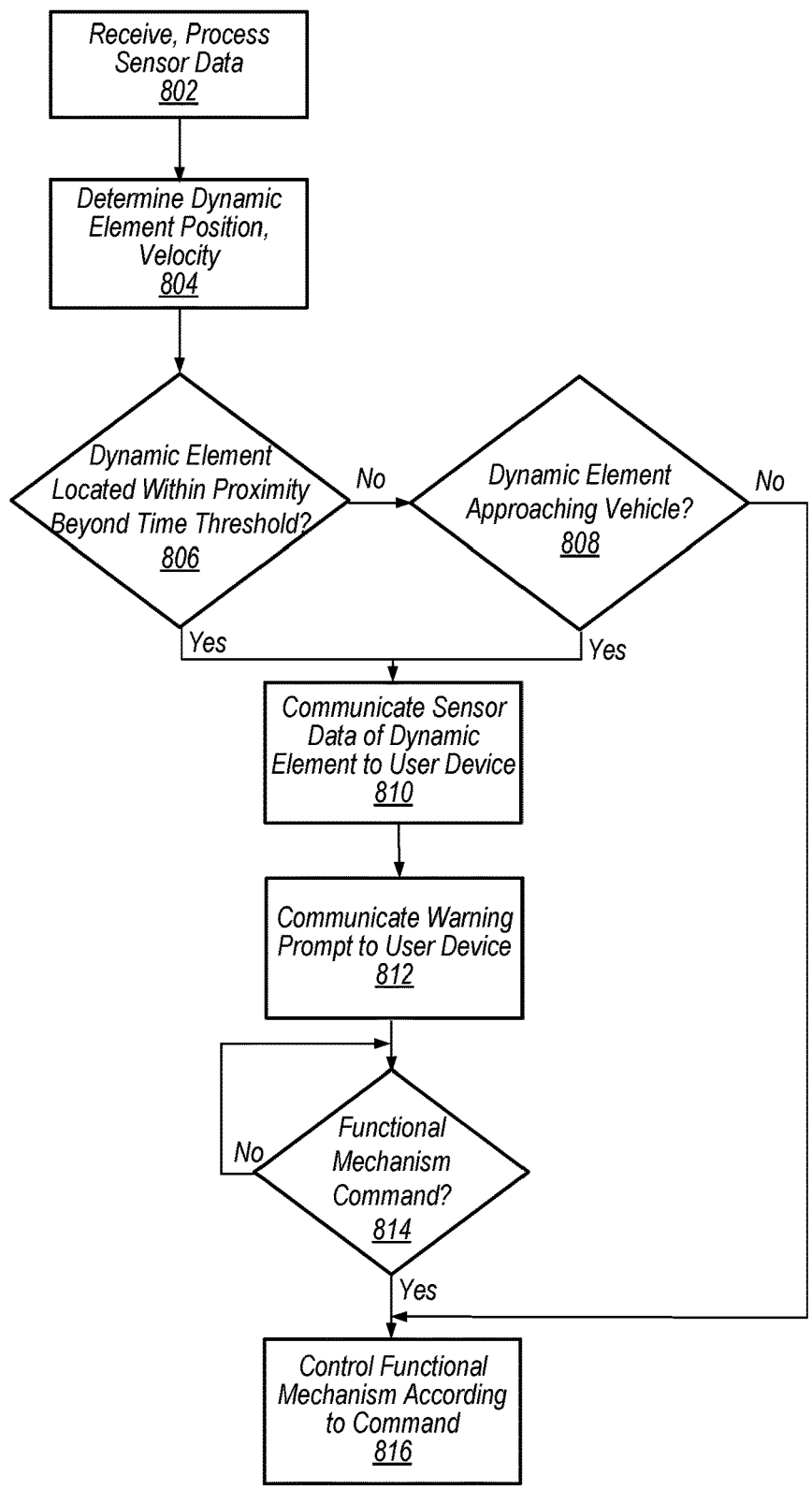
FIG. 8 illustrates communicating selected data to a user device supporting a particular user based on detection of dynamic elements in an external environment, according to some embodiments.

FIG. 8 illustrates communicating selected data to a user device supporting a particular user based on detection of dynamic elements in an external environment, according to some embodiments. The controlling can be implemented by any of the embodiments of protection modules included herein. A protection module can be implemented by one or more computer systems.

At 802, one or more instances of sensor data generated by one or more sensor devices included in a vehicle are received and processed. At 804, based on the processing, a dynamic element is detected in the external environment in which the vehicle is located, where detection of the dynamic element includes determining one or more of a present position, velocity, acceleration, etc. of the dynamic element through the environment.

At 806 and 808, a determination is made regarding whether the detected dynamic element, which can be determined based on one or more of a determined position, velocity, acceleration, etc. of the dynamic element through the environment, is located within a certain proximity region associated with one or more of the vehicle, of one or more particular portals of the vehicle, etc., and a further determination is made regarding whether the dynamic element is moving along a trajectory that approaches the vehicle.

If so, as shown, at 810, a limited selection of sensor data, generated by one or more sensor devices included in the vehicle, which includes sensor data representations of the detected dynamic element are communicated to a user device that supports one or more particular individuals. The user device can be determined via accessing a database that associates user device communication link contact addresses with a user profile of a particular authorized individual. The communication can include identifying an authorized individual; identifying, based on processing sensor data, that the authorized individual is absent from the vehicle interior; identifying a particular supporting user device via accessing a database of user devices associated with authorized individuals; and further identifying a contact address associated with the particular supporting user device. Sensor data representations of a detected dynamic element can include sensor data that characterizes one or more aspects of the dynamic element. For example, a sensor data representation of a dynamic element can include an image, captured by a camera sensor device, in which an image of at least a portion of the dynamic element is included.

In addition, as shown at 812, a warning prompt is generated that can be provided through an interface of the user device and includes an indication that the dynamic element is detected within the proximity region. In some embodiments, the prompt includes a functional mechanism command interface via which an occupant can interact to provide one or more functional mechanism commands.

At 814, a determination is made regarding whether a functional mechanism command, which includes a command to control one or more particular functional mechanisms in the vehicle to provide one or more observable (i.e., audio, visual, etc.) indications to the dynamic element is received. If so, at 816, the one or more particular functional mechanisms are controlled as commanded by the received functional mechanism command.

Figure 9:
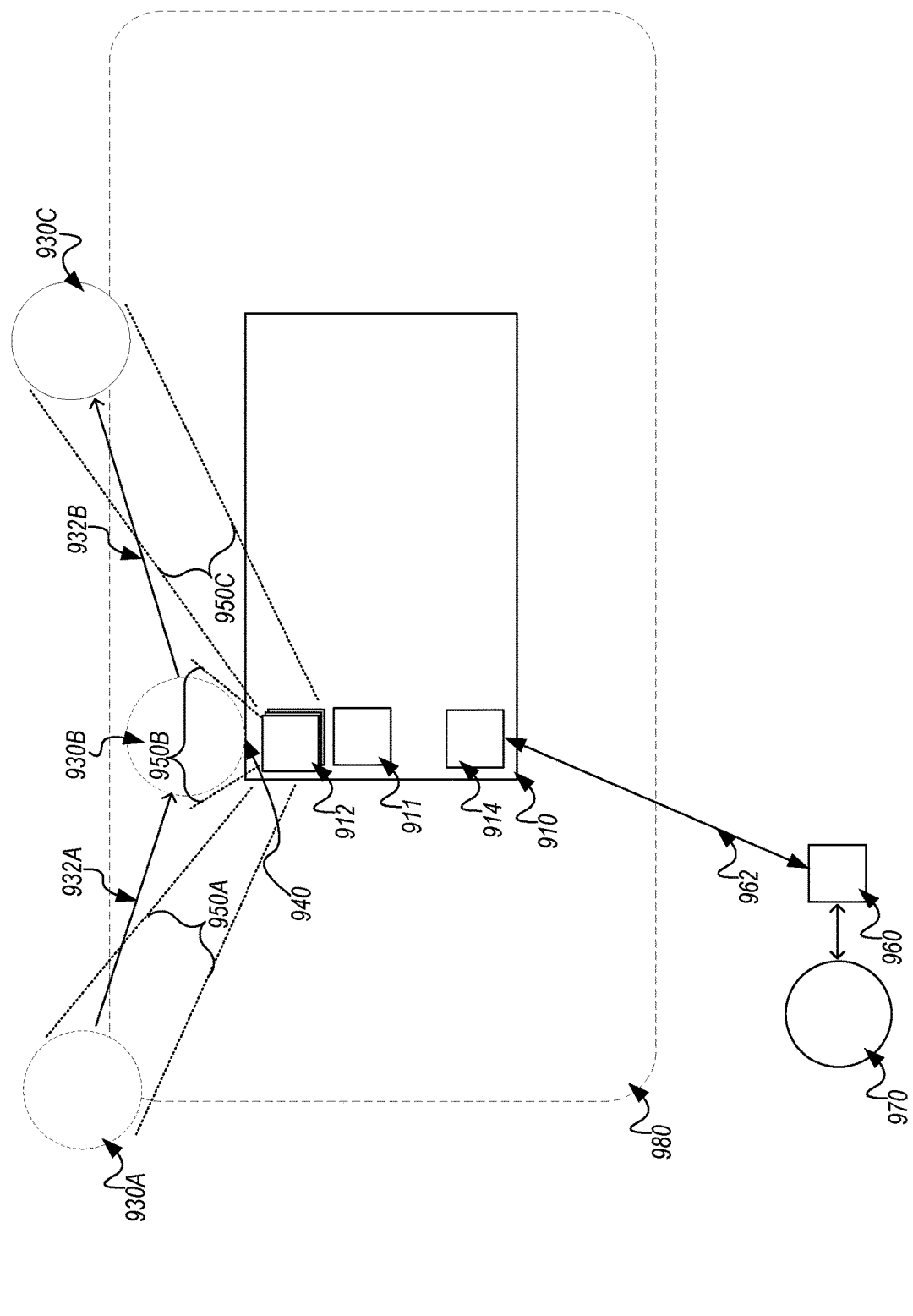
FIG. 9 illustrates a vehicle that communicates selected data to a user device supporting a particular user based on dynamic elements detected in the external environment, according to some embodiments.

FIG. 9 illustrates a vehicle that includes a protection module configured to communicate selected data to a user device supporting a particular user based on dynamic elements detected in the external environment, according to some embodiments. The vehicle 910 illustrated in FIG. 9 can include any of the embodiments of vehicles included herein, including vehicle 110 illustrated in FIG. 1. The protection module 911 illustrated in FIG. 9 can include any of the embodiments of protection modules included herein, including module 111 illustrated in FIG. 1.

Vehicle 910, located in a common environment 900 with dynamic element 930, includes a set of sensor devices 912, a protection module 911, a communication interface 914, and a set of functional mechanisms 916. An individual 970 associated with the vehicle 910 is located externally to the vehicle 910 and is supported by a user device 940 that is communicatively coupled to the vehicle 910 via a communication link with interface 914. The communication link can include a two-way communication link established via one or more communication networks.

In some embodiments, a protection module included in a vehicle monitors a collision between the vehicle and a dynamic element in the environment when one or more particular authorized individuals are absent from the vehicle interior and, based at least in part upon detecting the collision, provides a user device supporting the authorized individual with sensor data providing representations of the colliding dynamic element as it moves through the environment, including representations of the dynamic element before, during, and after the collision with the vehicle.

As shown, module 911 initially detects dynamic element 930 at position 930A when the dynamic element enters proximity region 980. Based at least in part upon one or more of determining that the dynamic element is within region 980, is moving along a trajectory 932A that intersects with the vehicle 910, etc. module 911 can initiate recording of sensor data representations of the dynamic element as the dynamic element moves through the region 980. Such recording can include recording limited portions of sensor data generated by devices 912, where the limited portions include separate representations of the dynamic element characterized by sensor data generated at various times. As shown, when dynamic element 930 is located at position 930A, recorded sensor data can include a captured image of a portion of environment 900, including the dynamic element at position 930A, included within field of view 950A.

As shown, the dynamic element, subsequently to being detected at position 930A, continues along trajectory 932A to collide with vehicle 910, at point 940 on a surface of the vehicle 910, when the dynamic element is located at position 930B, and the dynamic element subsequently moves along trajectory 932 until reaching position 930C at an edge of region 980. Module 911 can continue to record sensor data representations of the dynamic element as the element moves through region 980 along trajectories 932A-B and collides with vehicle 940. Module 911 can determine that the dynamic element has collided with point 940 on vehicle 910, when the element is at position 930B, based on processing sensor data generated by one or more senor devices, including one or more accelerometers, position orientation sensors, image capturing sensors, etc. Based on determining that the dynamic element has collided with vehicle 710, module 911 can generate a warning prompt that is communicated to the user device 960 supporting an identified authorized individual 970 via communication link 962, where the prompt includes an indication, which can be presented to the individual 970 via an interface of device 960, that a dynamic element has collided with the vehicle. The prompt can include an indication of the particular point 940, region, etc. of the vehicle exterior at which the collision occurred.

In some embodiments, module 911 can, in response to detecting the collision of the detected dynamic element 930 with vehicle 910 at point 940, communicate the recorded sensor data representations of the dynamic element to the user device 960 via link 962, so that the individual 970 can be provided with representations of the dynamic element that collided with vehicle 910. In some embodiments, where module 911 continues to record sensor data representations of the dynamic element as it moves through region 980, the module 911 can continue to record sensor data representations of the dynamic element subsequent to the collision. As shown, module 911 can record images of the dynamic element captured via field of view 950B when the dynamic element is at position 930B at the time of collision, images of the dynamic element captured via field of view 950C when the dynamic element is at position 930C at the time when the dynamic element leaves region 980, etc.

In some embodiments, to record sensor data representations of a dynamic element as the dynamic element moves through an environment, module 911 can control one or more sensor devices 912 to track the dynamic element through the environment. For example, where a sensor device 912 includes a camera device that can capture images of portions of environment 900 within a field of view of the camera, module 911 can, in response to detection of a dynamic element at position 930A, control the orientation, field of view, etc. of the camera to cause the field of view 950A-C to track the dynamic element as it moves along trajectories 932A-B through positions 930A-C through environment 900, so that the camera is controlled to capture images of the dynamic element as the dynamic element moves through the environment.

Figure 10:
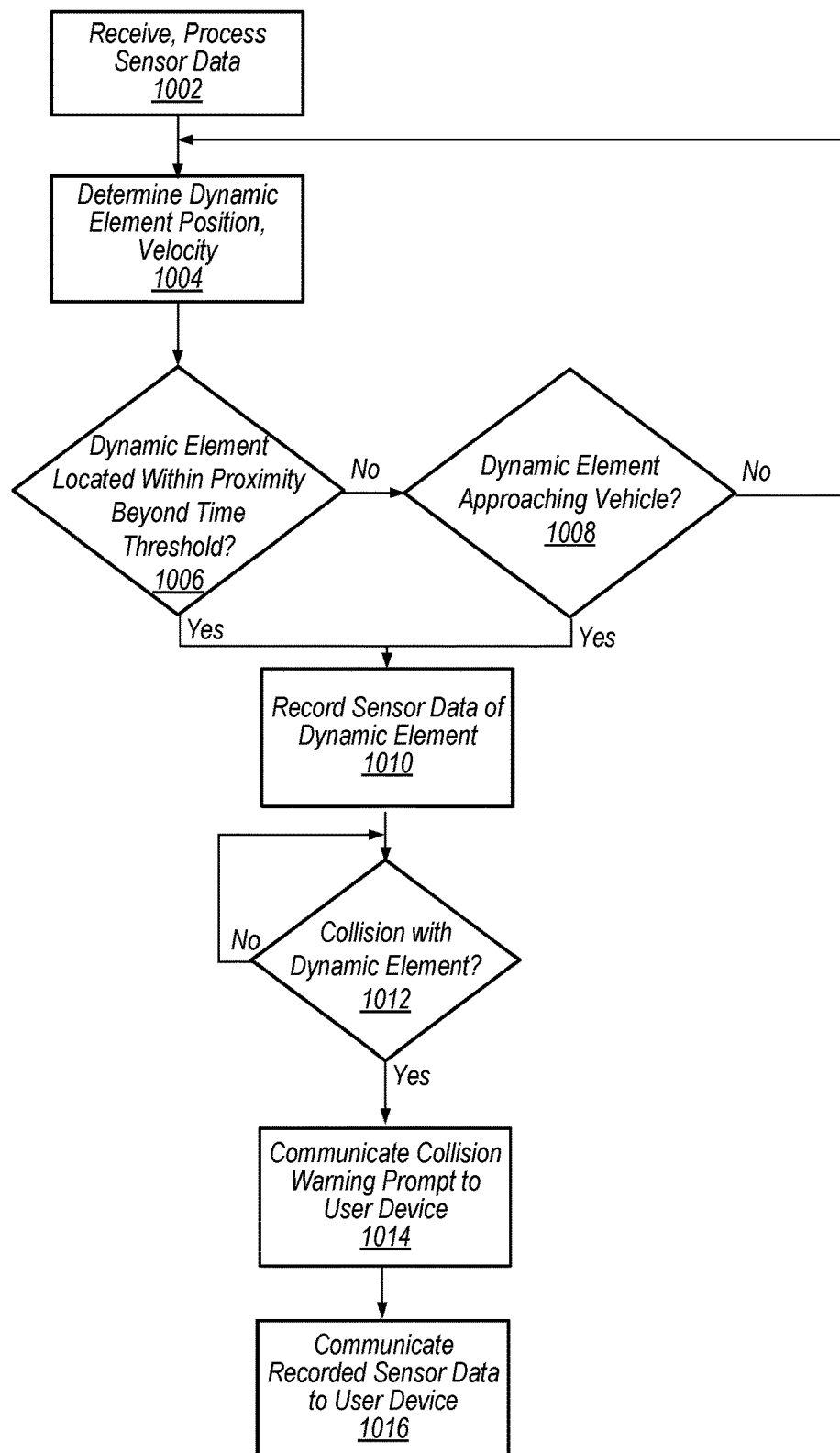
FIG. 10 illustrates communicating selected data to a user device supporting a particular user based on detection of dynamic elements in an external environment, according to some embodiments.

FIG. 10 illustrates communicating selected data to a user device supporting a particular user based on detection of dynamic elements in an external environment, according to some embodiments. The controlling can be implemented by any of the embodiments of protection modules included herein. A protection module can be implemented by one or more computer systems.

At 1002, one or more instances of sensor data generated by one or more sensor devices included in a vehicle are received and processed. At 1004, based on the processing, a dynamic element is detected in the external environment in which the vehicle is located, where detection of the dynamic element includes determining one or more of a present position, velocity, acceleration, etc. of the dynamic element through the environment.

At 1006 and 1008, a determination is made regarding whether the detected dynamic element, which can be determined based on one or more of a determined position, velocity, acceleration, etc. of the dynamic element through the environment, is located within a certain proximity region associated with one or more of the vehicle, of one or more particular portals of the vehicle, etc., and a further determination is made regarding whether the dynamic element is moving along a trajectory that approaches the vehicle.

If so, as shown, at 1010, a limited selection of sensor data, generated by one or more sensor devices included in the vehicle, including sensor data representations of the detected dynamic element, are recorded. Sensor data representations of a detected dynamic element can include sensor data that characterizes one or more aspects of the dynamic element. For example, a sensor data representation of a dynamic element can include an image, captured by a camera sensor device, in which an image of at least a portion of the dynamic element is included. The recorded sensor data representation of the dynamic element can include a limited selection of sensor data generated by sensor devices included in the vehicle, including a limited portion of sensor data representations of one or more portions of the external environment in which the vehicle is located. In some embodiments, sensor data representations of the dynamic element are continuously recorded for a duration of elapsed time in which the dynamic element is located within a proximity distance of the vehicle, where recording of additional sensor data representations is terminated upon a determination that the dynamic element is located more than a threshold distance from the vehicle.

In some embodiments, recorded sensor data representations of a dynamic element are stored as a set of representations at the vehicle. The stored set can be communicated to one or more external devices based on user interaction with one or more interfaces included in the vehicle.

At 1012, a determination is made regarding whether the dynamic element has collided with the vehicle at one or more various points, regions, etc. along the vehicle exterior. If so, at 1014, a warning prompt is generated that can be provided through an interface of a particular user device supporting a particular authorized user and includes an indication that the dynamic element has collided with the vehicle at one or more particular points, regions, etc. of the vehicle exterior.

The particular user device can be determined via accessing a database that associated user device communication link contact addresses with a user profile of a particular authorized individual. The communication can include identifying an authorized individual, identifying a particular supporting user device via accessing a database of user devices associated with authorized individuals, and further identifying a contact address associated with the particular supporting user device.

In addition, at 1016, the recorded sensor data representations of the dynamic element are communicated to the user device. Where the sensor data representations are continuously being recorded concurrently with communication of representations to the user device, a continuous stream of sensor data generated by one or more sensor devices can be communicated to the user device as a continuous data stream. For example, a streaming tracking video feed of a limited portion of the environment in which the dynamic element is located can be communicated to the user device.

Figure 11:
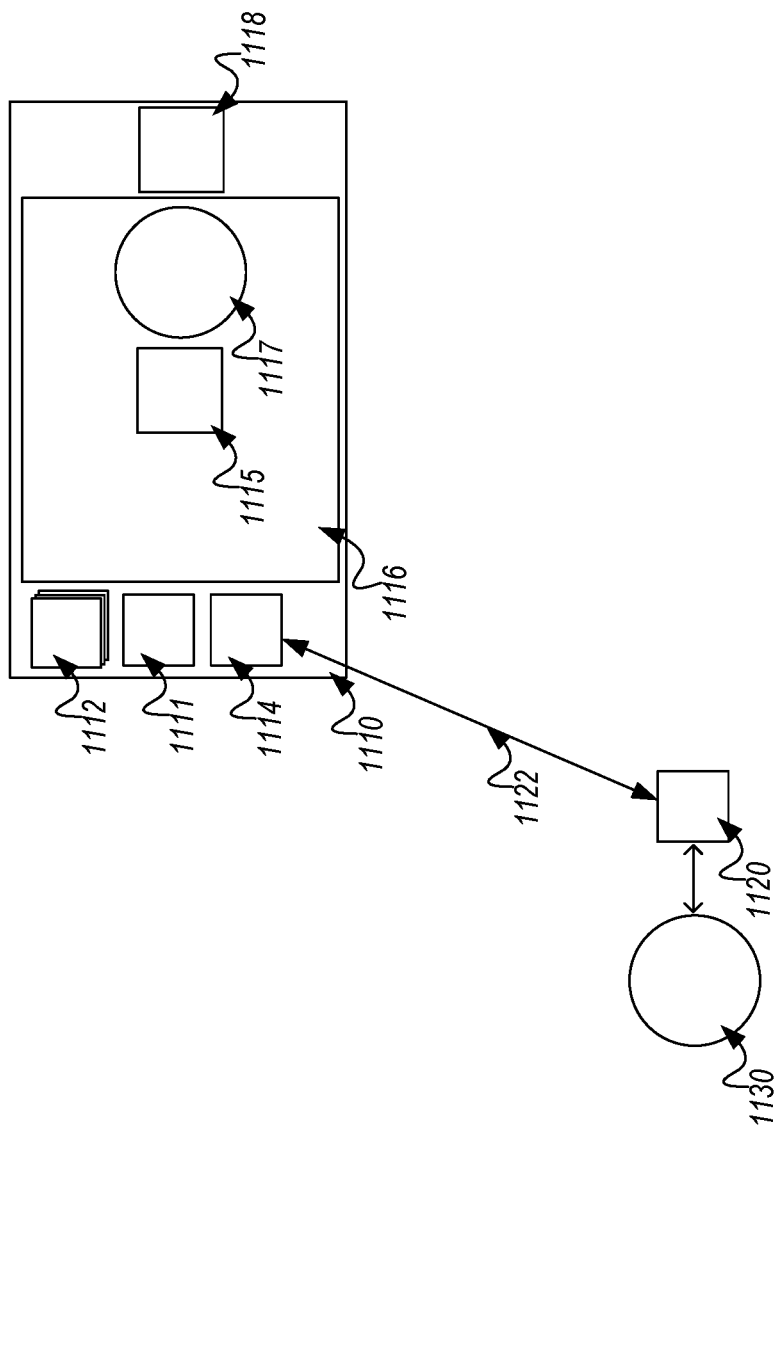
FIG. 11 illustrates a vehicle that adjustably controls climate control devices in the vehicle based on occupants detected in the vehicle interior, according to some embodiments.

FIG. 11 illustrates a vehicle that includes a protection module configured to adjustably control climate control devices in the vehicle based on occupants detected in the vehicle interior, according to some embodiments. The vehicle 1110 illustrated in FIG. 11 can include any of the embodiments of vehicles included herein, including vehicle 110 illustrated in FIG. 1. The protection module 1111 illustrated in FIG. 11 can include any of the embodiments of protection modules included herein, including module 111 illustrated in FIG. 1.

Vehicle 1110, located in a common environment 1100, includes a set of sensor devices 1112, a protection module 1111, a communication interface 1114, a vehicle interior 1116, one or more climate control devices 1118 configured to adjustably control one or more parameters of an interior environment of the interior 1116, and an interface 1115. An occupant 1117 is located within interior 1116. A user device 1120 supporting an authorized individual 1130 is located external to vehicle 1110 and is communicatively coupled to vehicle 1110 via a communication link 1122 with interface 1114.

In some embodiments, the one or more climate control devices 118 include one or more of an air conditioning unit, an air moving device, an adjustable air vent, a heater unit, some combination thereof, etc.

In some embodiments, a protection module included in a vehicle is configured to monitor an internal environment of a vehicle interior and to, in response to detecting one or more occupants of the vehicle where one or more authorized individuals are absent from the vehicle interior and further detecting that one or more environmental parameters of the interior 1116 environment at least meets one or more threshold values, control one or more of the climate control devices 1118 included in the vehicle 1110 to adjust one or more parameters of the environment to within the one or more threshold values.

An authorized individual can include one or more individuals associated with a particular user profile, one or more individuals associated with a particular occupant type, some combination thereof, etc. An occupant type can include a human adult, a human child, a human senior, an animal, etc., and an individual associated with a particular user profile can be identified based on facial recognition data associated with the user profile.

In some embodiments, module 1111 controls one or more climate control devices 1118 to adjust the environment of interior 1116 to comprise environmental parameters that are within a range of values based at least in part upon a determination that the interior 1116 is occupied by occupants associated with one or more particular occupant types. For example, module 1111 can control climate control devices 1118 based at least in part upon a determination that occupant 1117 is a human child occupant and human adult occupants are absent from interior 1116. In another example, module 1111 can control climate control devices 1118 based at least in part upon a determination that occupant 1117 is an animal occupant and human adult occupants are absent from interior 1116. Module 1111 can be configured to control climate control devices 1118 to to cause the environment 1116 to approximate a particular range of parameter values based on a determination that the interior 1116 is occupied by occupants 1117 of an occupant type other than that of a human adult occupant.

Environmental parameters can include one or more of air temperature, humidity, etc. Module 1111 can respond to a determination that the interior 1116 is occupied by occupants 1117 of an occupant type other than that of a human adult occupant and that one or more environmental parameters of the environment of interior 1116 meets a threshold value by adjustably controlling one or more climate control devices 1118 to adjust the environmental parameter to fall within the threshold value. Where module 1111 controls one or more climate control devices 1118 to control one or more particular environmental parameters, module 1111 can selectively control one or more particular climate control devices that are configured to adjustably control the one or more particular environmental parameters. For example, where module 1111 determines that a temperature of environment in interior 1116 meets a high temperature threshold, and the interior 1116 is occupied by an occupant 1117 of an occupant type other than that of a human adult occupant, module 1111 can selectively control an air conditioning unit climate control device 1118 to cause the environment temperature to fall within the threshold value. In another example, where module 1111 determines that a temperature of environment in interior 1116 meets a low temperature threshold, and the interior 1116 is occupied by an occupant 1117 of an occupant type other than that of a human adult occupant, module 1111 can selectively control a heater unit climate control device 1118 to cause the environment temperature to rise within the threshold value.

In some embodiments, module 1111, in response to detecting vehicle interior occupants associated with particular occupant types and detecting one or more environmental parameters of the vehicle interior that meet one or more threshold values, generates a warning prompt that is communicated, via communication link 1122, to one or more user devices 1120 supporting one or more authorized individuals 1130. The warning prompt can include sensor data representations of one or more portions of the vehicle interior 1116, including captured images, streaming video, etc. of the one or more occupants 1117. The prompt can include an alert that the occupants 1117 are located in a vehicle interior with extreme environmental conditions, an invitation to travel to the vehicle 1110 and access the interior 1116, an invitation to communicate with the occupant 1117 via communication link 1122 and interface 1115, etc.

An authorized individual, and supporting user device, can be identified based on accessing a database that includes a set of user profiles associated with authorized individuals. Each user profile can include user device contact address information associated with user devices supporting to the authorized individual. Module 1111 can, in response to detecting vehicle interior occupants associated with particular occupant types and detecting one or more environmental parameters of the vehicle interior that meet one or more threshold values, identify an authorized individual and supporting user device contact address information and further communicate a warning prompt to the supporting user device.

In some embodiments, module 1111, in response to failing to receive a response from the individual 1130 via device 1120, generates a warning signal to one or more alternative remote systems, services, etc. via interface 1114, including one or more local emergency services, additional authorized individuals, etc.

Figure 12:
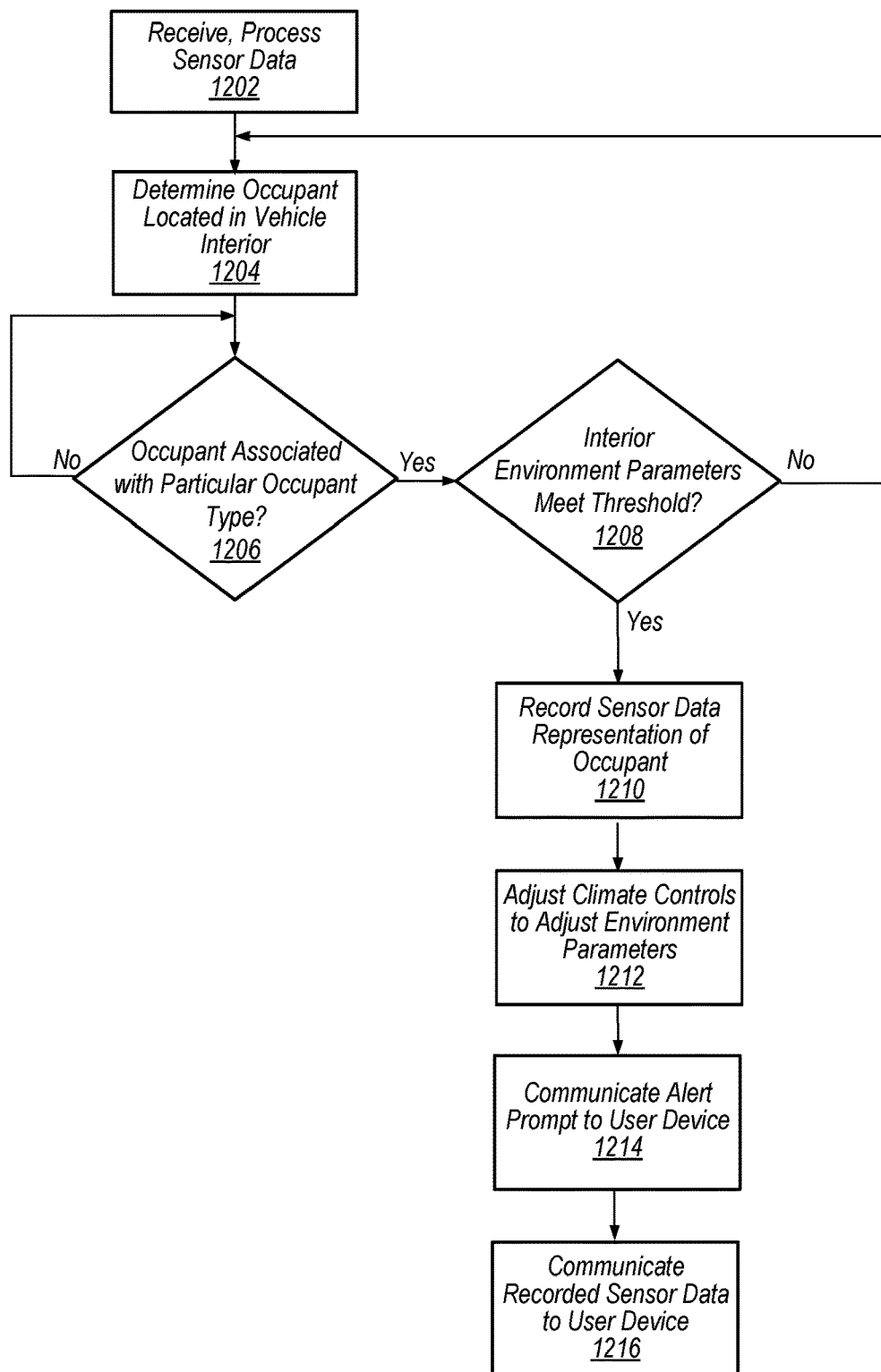
FIG. 12 illustrates controlling climate control devices in a vehicle based on occupants detected in the vehicle interior, according to some embodiments.

FIG. 12 illustrates controlling climate control devices in a vehicle based on occupants detected in the vehicle interior, according to some embodiments. The controlling can be implemented by any of the embodiments of protection modules included herein. A protection module can be implemented by one or more computer systems.

At 1202, one or more instances of sensor data generated by one or more sensor devices included in a vehicle are received and processed. At 1204, based on the processing, an occupant is detected in the interior of the vehicle, where detection of the occupant includes determining a particular occupant type with which the detected occupant is associated.

At 1206, a determination is made regarding whether the occupant is associated with one or more of a set of particular occupant types. A set of particular occupant types can include human child occupants, human senior occupants, animal occupants, etc., while certain occupant types, including human adult occupants, can be excluded from the set. If the occupant is associated with a particular occupant type, a further determination is made, at 1208, regarding whether one or more environmental parameters, including one or more of interior temperature, humidity, etc., at least meets one or more predetermined environmental parameter threshold values.

If so, as shown at 1210, one or more sensor data representations of the occupant, comprised within limited selections of sensor data generated by one or more sensors devices monitoring the vehicle interior, are recorded. At 1212, one or more particular climate control devices are adjustably controlled to cause the one or more environmental parameters that are determined to at least meet the one or more predetermined environmental parameter threshold values to be adjusted to at least meet a separate parameter value.

At 1214, a warning prompt is generated that can be provided through an interface of a to particular user device supporting a particular authorized individual and includes an indication that the detected occupant of the vehicle is located in a vehicle interior in which environmental parameters have at least met one or more predetermined threshold values. In addition, at 1216, the recorded sensor data representations of the occupant are communicated to the user device. Where the sensor data representations are continuously being recorded concurrently with communication of representations to the user device, a continuous stream of sensor data generated by one or more sensor devices can be communicated to the user device as a continuous data stream.

In some embodiments, a determination is made regarding whether a response is received from the particular user device within a certain period of elapsed time following generation of the warning prompt at 1214. If no response is received following the elapse of the certain period of time, another warning prompt can be generated and communicated to one or more additional remote devices, systems, services, etc., including one or more predetermined emergency services, alternative contact addresses associated with the authorized individual, etc.

Figure 13:
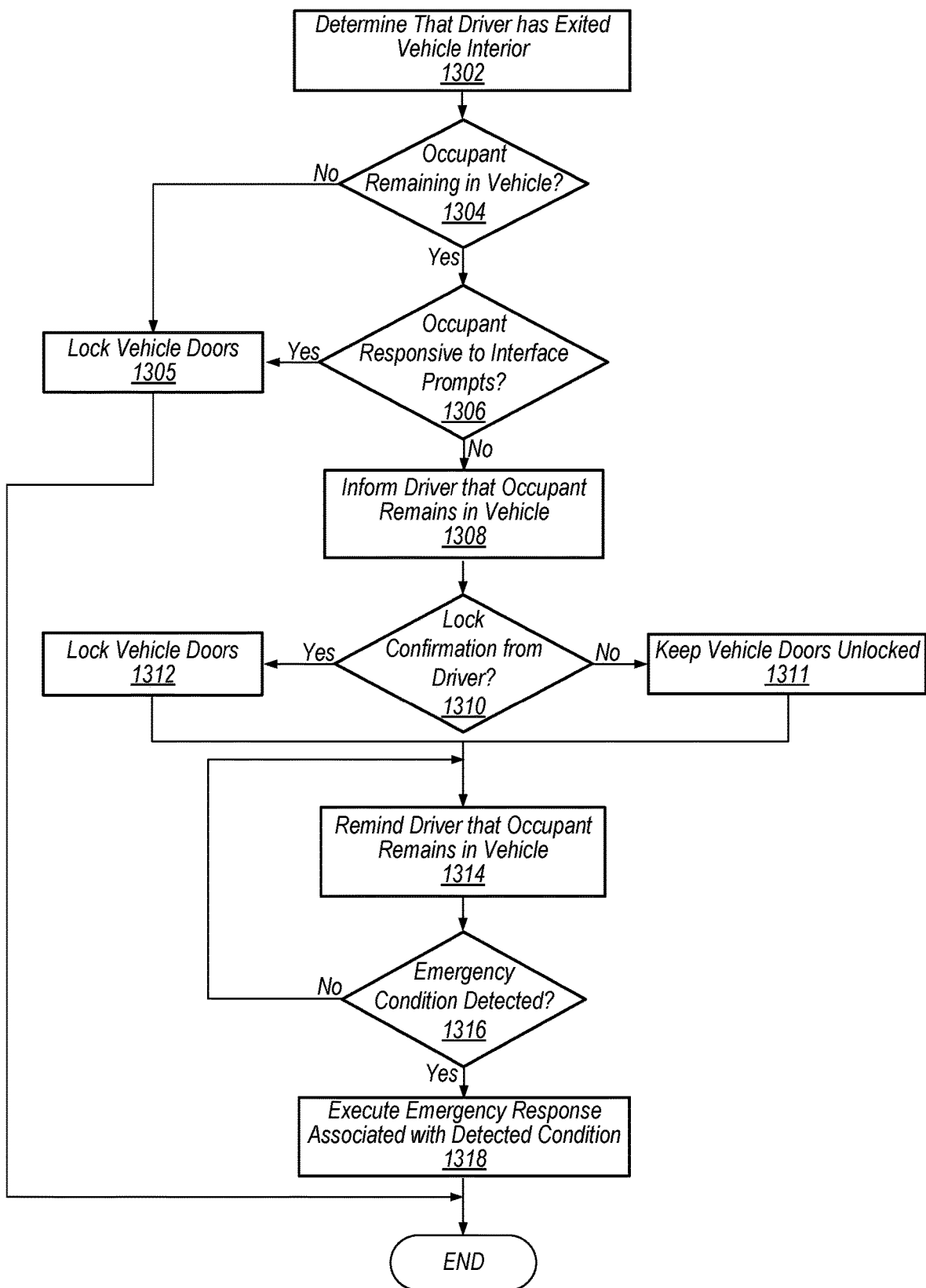
FIG. 13 illustrates managing various vehicle elements and communicating with various entities based on occupants detected in the vehicle interior and detection of emergency conditions associated with a vehicle, according to some embodiments.

FIG. 13 illustrates managing various vehicle elements and communicating with various entities based on occupants detected in the vehicle interior and detection of emergency conditions associated with a vehicle, according to some embodiments. The controlling can be implemented by any of the embodiments of protection modules included herein. A protection module can be implemented by one or more computer systems.

At 1302, the protection module determines that a primary user (e.g., owner, driver, so forth) of the vehicle has exited the vehicle interior. Such a determination can be based on a determination, based on processing sensor data, that an occupant located in a particular (e.g., driver) position of the vehicle interior has exited the vehicle interior, a determination that a user device supporting a primary user of the vehicle has exited the vehicle interior, etc. The user device supporting a primary user of the vehicle can include a vehicle key device, an electronic device associated with a user profile of the user, etc.

At 1304, a determination is made regarding whether at least one occupant remains within the vehicle interior subsequent to the primary user leaving the vehicle interior. The determination can be made based on processing sensor data generated by one or more sensor devices included in the vehicle.

In some embodiments, the one or more sensor devices includes an ultra-wide band radar device that can feature high range resolution, and a protection module can detect one or more various life sign signatures associated with an occupant, including a breathing pattern and heart beats through micro-Doppler analysis of data generated by the device. In some embodiments, the various life signs signatures that can be detected based on processing sensor data generated by a radar device can be utilized to associate a detected occupant with a particular occupant type, including that of a human child, human elderly, dog, cat, pet, etc. In some embodiments, the processed sensor data can be utilized to determine whether a health state associated with the occupant exceeds one or more threshold values, such that the occupant is determined to be associated with an emergency health state.

In some embodiments, the one or more sensor devices includes a microphone, a pressure sensor installed in a seat, a motion detection sensor, a camera device, a carbon dioxide density detector, a body temperature detector, some combination thereof, etc. A body temperature detector can include an infrared thermometer, a laser thermometer, etc.

At 1306, a determination is made regarding whether the occupant detected at 1304 is responsive to one or more prompts provided to the occupant via one or more user interfaces included in the vehicle. A prompt that can be provided to the occupant can include one or more of an audio prompt, visual prompt, etc. The prompt can include a request for the occupant to indicate a capacity of the occupant to exit the vehicle interior. In some embodiments, a user interface included in the vehicle includes one or more user interactive interfaces via which an occupant can interact to provide an indication of a capacity of the occupant to exit the vehicle interior.

At 1306, if no occupants remain in the vehicle, or if one or more detected occupants indicate a capacity to exit the vehicle interior via response to an interface prompt, one or more doors of the vehicle are locked. In some embodiments, the determinations at 1304 and 1306 are implemented in response to a command, received from a user device associated with the primary user, to lock the one or more vehicle doors, where the locking at 1305 is implemented based on the determinations at one or more of 1304 and 1306.

At 1308, a message is generated that is communicated to a user device supporting the primary user who has exited the vehicle interior, where the message includes content configured to inform the primary user, via one or more user interfaces of the user device, that one or more occupants remain in the vehicle. The content can, in some embodiments, identify an occupant type associated with one or more of the detected occupants in the determination at 1304. In some embodiments, the determination at 1306 is omitted, and the action at 1308 is implemented in response to a detection of an occupant remaining in the vehicle at 1304.

At 1310, a determination is made regarding whether a door locking confirmation signal is received from a user device supporting the primary user. In some embodiments, the determinations at 1304 and 1306 are implemented in response to a command, received from a user device associated with the primary user, to lock the one or more vehicle doors, and the message at 1308 comprises a prompt for the primary user to confirm, via interaction with one or more user interfaces of the user device supporting the primary user, whether to lock the one or more doors of the vehicle. If such a confirmation signal is received, the one or more vehicle doors are locked at 1312. If not, at 1311, the one or more vehicle doors remain unlocked. In some embodiments, keeping the one or more doors unlocked, at 1311, includes repeating the informing at 1308 one or more times.

At 1314, one or more reminder messages are generated and communicated to the user device supporting the primary user who has exited the vehicle interior, where the messages include reminders configured to remind the primary user, via one or more user interfaces of the user device, that one or more occupants remain in the vehicle. The content can, in some embodiments, identify an occupant type associated with one or more of the detected occupants in the determination at 1304.

At 1316, a determination is made regarding whether an emergency condition associated with the vehicle is detected. The determination can be made based on processing sensor data generated by one or more sensor devices installed in the vehicle.

An emergency condition can be detected based on a determination that a health state of one or more occupants in the vehicle at least meets one or more threshold values associated with an emergency health state. For example, an emergency condition can be detected based on a determination that one or more of a heart rate, breathing rate, etc. of a detected occupant of the vehicle interior at least meets a threshold heart rate, breathing rate that is associated with an emergency health state. The one or more thresholds can be associated with an occupant type that is associated with the detected occupant, so that a threshold heart rate associated with an emergency health state for a dog occupant is a different value than a threshold heart rate associated with an emergency health state for a human child occupant.

An emergency condition can be detected based on a determination that one or more environmental parameters of the vehicle interior environment at least meets one or more threshold values. For example, an emergency condition can be detected based on a determination that ambient air temperature in one or more portions of the vehicle at least meets one or more threshold values, a determination that a concentration of one or more substances, including carbon dioxide, in one or more portions of the vehicle at least meets one or more threshold values, a determination that a concentration of oxygen in one or more portions of the vehicle interior at least meets one or more threshold values, some combination thereof, etc.

An emergency condition can be detected based on a determination that one or more operating parameters of the vehicle at least meets one or more threshold values. For example, an emergency condition can be detected based on a determination that a primary power source included in the vehicle has failed, that an amount of stored energy remaining in one or more power sources included in the vehicle at least meets one or more threshold values, etc.

At 1318, based on a determination of an emergency condition, an emergency response associated with the detected condition is executed. An emergency response can include one or more of activating an alarm device installed in the vehicle, unlocking one or more doors of the vehicle, opening one or more windows of the vehicle, adjustably controlling one or more climate control devices installed in the vehicle, generating one or more signals that are communicated to one or more remote devices, systems, services, etc. An alarm device installed in the vehicle can include one or more of an audio signal generator device, a visual signal generator device, etc. A generated signal can include a message that is communicated to a user device supporting the primary user, a message that is communicated to an emergency service, including a "911" dispatch service, some combination thereof, etc. A generated signal can include information indicating the basis for the emergency condition being determined, one or more instances of data associated with the emergency condition, etc.

In some embodiments, separate emergency conditions can be determined based on separate determinations regarding the vehicle occupants, vehicle interior environment, vehicle itself, etc., where separate emergency conditions are associated with separate determined emergency conditions. For example, an emergency response executed based on an emergency condition that is determined based on a determined emergency health state of a vehicle occupant can include contacting an emergency service, while an emergency response executed based on an emergency condition that is determined based on a determined operating state of the vehicle can be limited to generating a message that is communicated to a user device supporting the primary user.

Figure 14:
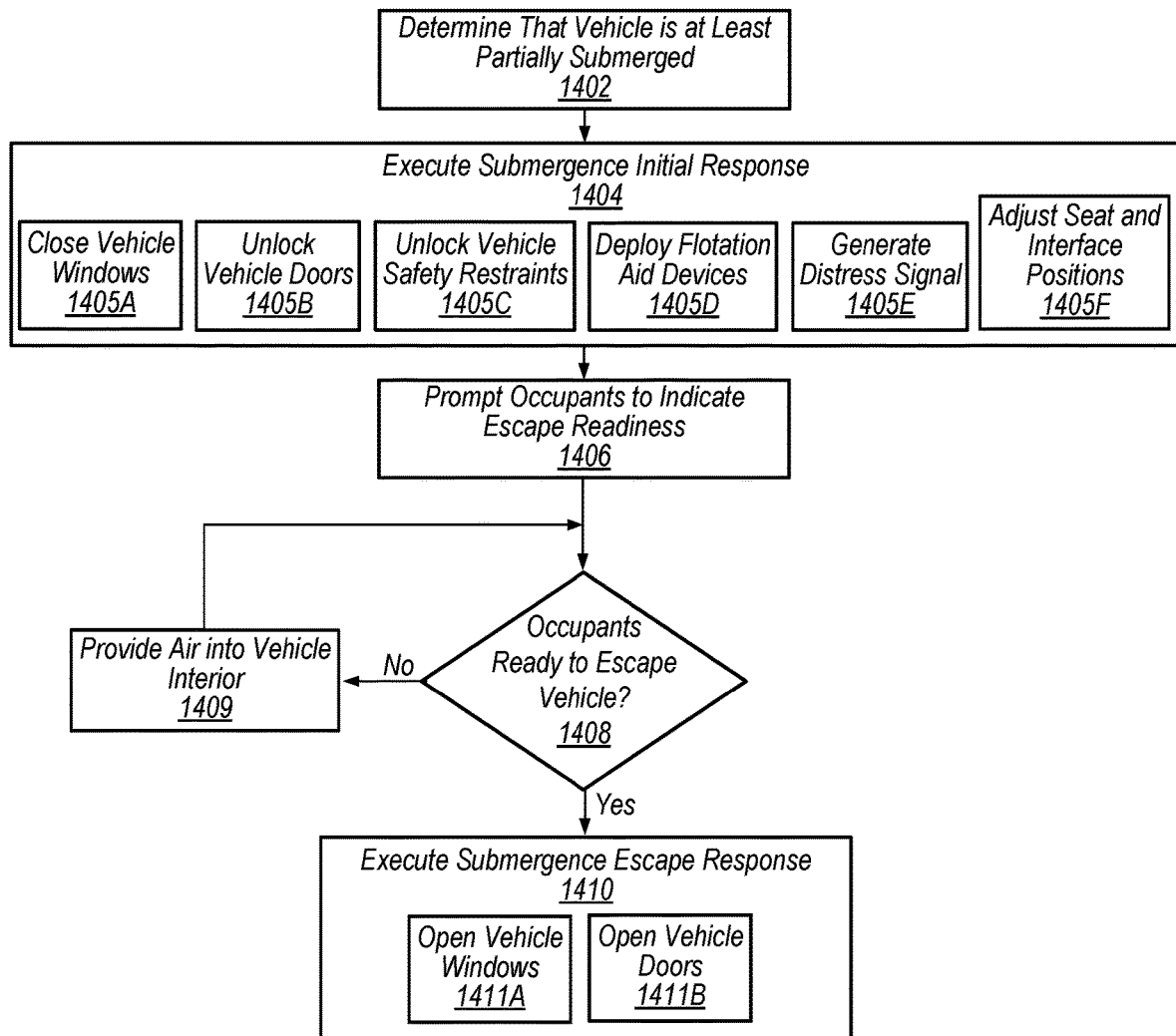
FIG. 14 illustrates responding to a detected at least partial submergence of a vehicle, according to some embodiments.

FIG. 14 illustrates responding to a detected at least partial submergence of a vehicle, according to some embodiments. The responding can be implemented by any of the embodiments of protection modules included herein. A protection module can be implemented by one or more computer systems.

At 1402, a determination is made, based on processing sensor data generated by one or more sensor devices, that the vehicle is at least partially submerged in a fluid, where a fluid can include water. In some embodiments, a vehicle comprises one or more sensor devices that are configured to detect fluid pressure on one or more external surfaces of the vehicle, and at least partial submergence of the vehicle can be determined based on a determination that a fluid pressure detected on one or more particular external surface of the vehicle at least meets one or more particular threshold values. For example, based on a determination that a fluid pressure on a roof surface, including an external surface of a moon roof, meets a threshold pressure, the vehicle can be determined to be fully submerged. In another example, based on a determination that a fluid pressure on a side window of the vehicle at least meets a threshold pressure and a fluid pressure on a roof surface is less than the threshold pressure, the vehicle can be determined to be partially submerged. In some embodiments, sensor data generated by one or more liquid sensors included in the vehicle, including one or more rain sensor devices installed in the vehicle and configured to detect precipitation, can provide confirmation of fluid presence on the exterior of the vehicle to provide a secondary indication of vehicle submergence.

At 1404, in response to the determination that the vehicle is at least partially submerged, a submergence initial response is executed. The submergence initial response, when executed, can include one or more adjustments 1405A-F to the vehicle which cause the flow of fluid into the vehicle interior to be at least partially mitigated, to give occupants of the vehicle time and interior maneuvering space to prepare themselves to escape the vehicle. Such preparation can include orienting themselves to escape the vehicle via one or more windows, doors, etc. of the vehicle, removing any restrains that might prevent escape, etc.

As shown, the adjustments 1405A-F included in the submergence initial response can include one or more of closing one or more vehicle windows, unlocking one or more vehicle doors, unlocking one or more vehicle safety restraints, deploying one or more flotation aid devices installed in the vehicle, generating one or more distress signals, and adjusting one or more interior seat and interface positions. Closing vehicle windows 1405A can mitigate the flow of fluid into the vehicle, thereby giving occupants more time to prepare to escape the vehicle. Unlocking the vehicle doors can configure the vehicle doors to be manually opened by the occupants, even if power supply to the doors is lost during the submergence. Unlocking the safety restraints 1405C, which can include safety belts, can enable the occupants to be configured to escape the vehicle without hindrance. In some embodiments, a mechanism, included in the vehicle, that is configured to unlock one or more vehicle safety restraints may be susceptible to failure as a result of one or more of electrical or mechanical failure. In some embodiments, the mechanism comprises a fail-safe mechanism that is configured to unlock one or more safety restraints based on one or more of an electrical failure, mechanical failure, etc. of one or more portions of the vehicle. In some embodiments, the unlocking 1405C comprises providing a cutting device that is configured to cut through one or more safety restraints. The cutting device can be included in a safety restraint device as a fail-safe that is activated in response to one or more of an electrical failure, mechanical failure, etc. In some embodiments, the cutting device included in a safety restraint device is activated, at 1405C, independently of one or more of an electrical failure, mechanical failure, etc. In some embodiments, the cutting device is separate from the safety restraint device and is deployed from a portion of the vehicle for manual access and utilization as part of unlocking 1405C.

Deployed flotation aids 1405D can include one or more inflatable devices configured to assist occupants in escaping the vehicle and reaching the fluid surface. A flotation aid can be deployed from various locations in the vehicle interior, and deployment can include at least partial inflation of the aid. In some embodiments, the deployment includes providing one or more audio indicators, visual indicators, etc. regarding a location of a flotation aid device in the vehicle interior, so that an occupant can locate the flotation aid device and inflate the device manually. In some embodiments, the flotation aid devices are configured to be automatically mounted onto the occupants at 1405D. In some embodiments, the floatation aid device comprises one or more instances of equipment, including one or more transceiver devices configured to transmit a distress signal that can be utilized by others to locate a position associated with one or more of the vehicle, occupants escaping the vehicle, etc. The equipment included in the flotation aids can be configured to be activated as part of deploying the aids at 1405D. The distress signal 1405E can include one or more of a signal communicated via one or more communication networks, an audio signal, a visual signal, some combination thereof, etc. In some embodiments, the distress signal includes information indicating a geographic location of the vehicle. Adjusting one or more seat and interface positions 1405F can include adjusting a position of one or more interior seats, including moving the seats away from the dashboard to increase interior maneuvering space for occupants of the vehicle, adjusting a position of one or more user interfaces to increase interior maneuvering space, including moving a steering wheel device, foot pedals, etc. away from the positions of the occupants, etc.

At 1406, a prompt is provided to the occupants, via one or more user interfaces installed in the vehicle, which prompts the occupants to indicate whether the occupants are prepared to escape the vehicle. The prompt can comprise one or more of an audio prompt provided via an audio interface, a visual prompt provided via a visual interface, some combination thereof, etc. The prompt can specify how the occupants can indicate readiness. Readiness can be indicating via occupant interaction with one or more user interfaces, which can include interaction with one or more user interfaces that are separate from the one or more user interfaces via which the prompt is provided. For example, the prompt can include an audiovisual prompt that requests that the occupants indicate readiness to escape the vehicle via pressing a button interface installed in the vehicle. In some embodiments, the prompt can specify a period of time remaining until the vehicle automatically executes a submergence escape response at 1410 without receiving a readiness indication from the occupants, where the occupants can accelerate the execution of the response at 1410 via indicating readiness prior to the expiration of the time period.

At 1408, a determination is made regarding whether the occupants have indicated a readiness to escape the vehicle. In some embodiments, the vehicle includes one or more devices configured to provide one or more breathable gasses, including oxygen, into the vehicle interior, and such devices can be controlled, at 1409 to provide at least some air in response to a determination that the occupants have not provided the indication at 1408. Such one or more devices can include one or more pressurized gas container devices configured to provide a breathable gas from a pressurized gas vessel, a device configured to generate a breathable gas based on a chemical reaction of one or more reactants included in the device, some combination thereof, etc.

At 1410, based at least in part upon one or more of a determination that the occupants are ready to escape the vehicle, an expiration of a period of time, a determination that an amount of breathable gas in the vehicle interior is less than a threshold value, some combination thereof, etc. a submergence escape response is executed that exposes the vehicle interior to the external environment, which can be comprised of the fluid, in a controlled manner that enables the occupants to escape the vehicle. Such a response at 1410 can include one or more of at least partially opening one or more vehicle windows 1411A, at least partially opening one or more vehicle doors 1411B, some combination thereof, etc. so that fluid is allowed to enter the vehicle interior and at least partially reduce a pressure differential between the vehicle interior and the external environment. In some embodiments, the vehicle comprises. Opening a window at 1411A can include at least partially opening one or more selected windows, including a moon roof, a window that is furthest from the one or more occupants in the vehicle interior, etc. In some embodiments, the vehicle includes one or more windows comprised of tempered material, including tempered glass, which is configured to break into a plurality of relatively small particles upon structural failure, so that the exposed portal as a result of the window failure is unobstructed by a remainder portion of the window, including shards, which can mitigate escape through the portal and could injure occupants attempting to escape through the portal. In some embodiments, the vehicle includes a puncture device configured to shatter a tempered window as part of opening a vehicle window at 1411A. In some embodiments, the vehicle comprises a puncture device that is configured to shatter a tempered window in response to a loss of power supply to one or more portions of the vehicle. In some embodiments, the puncture device is configured to shatter a tempered window independent of a power supply failure. For example, based on a pressure difference between the vehicle interior and the fluid external to the vehicle, opening the windows via a motor device can be mitigated, and the puncture device can be activated to shatter the glass as part of opening the vehicle window at 1411A.

Figure 15:
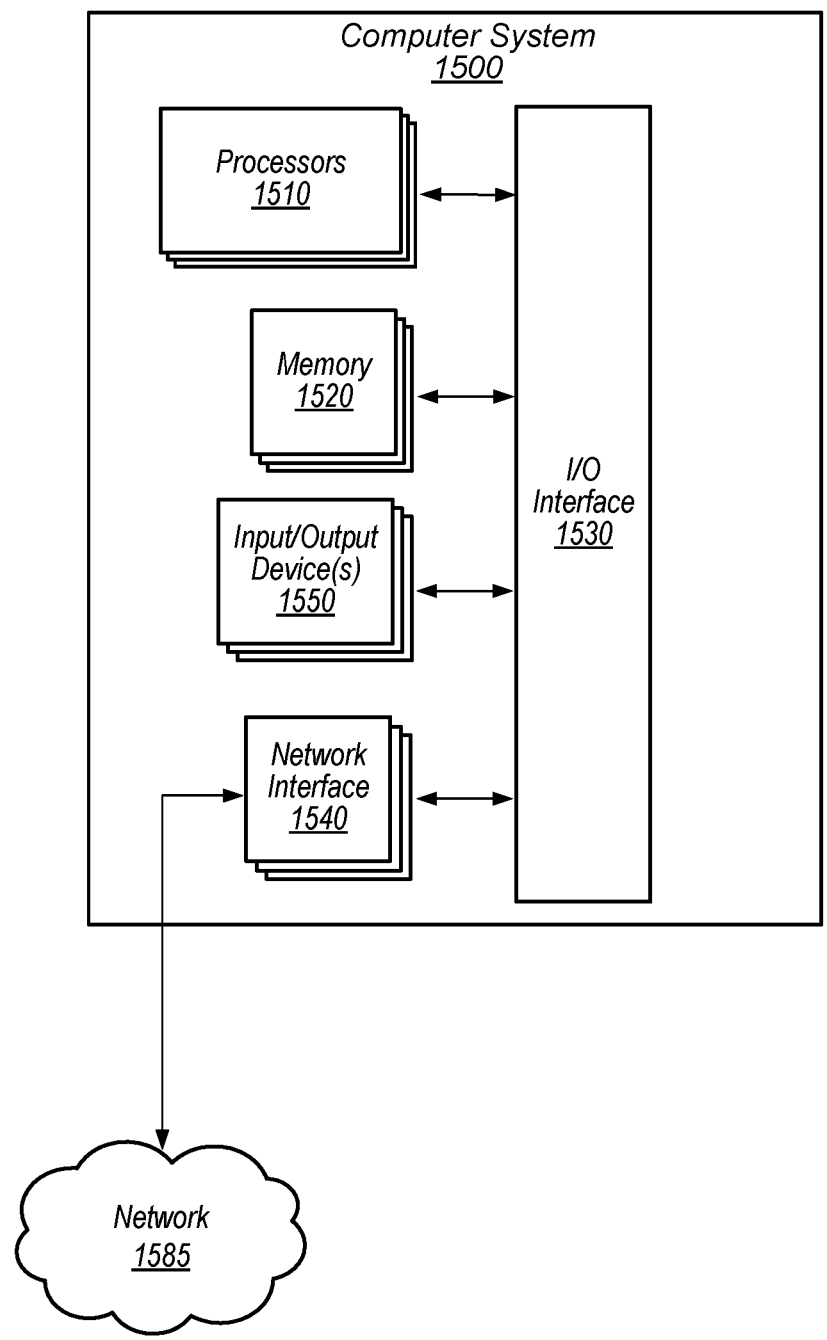
FIG. 15 illustrates an example computer system configured to implement aspects of a system and method for autonomous navigation, according to some embodiments.

FIG. 15 illustrates an example computer system 1500 that may be configured to include or execute any or all of the embodiments described above. In different embodiments, computer system 1500 may be any of various types of computing devices, including, but not limited to, those powered by one or more microprocessors such as CPUs and/or GPUs. Exemplary computer systems include a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a protection module, as described herein, may be executed in one or more computer systems 1500, which may interact with various other devices. Note that any component, action, or functionality described above with respect to FIG. 1 through 14 may be implemented on one or more computers configured as computer system 1500 of FIG. 15, according to various embodiments. In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices, which can include one or more user interface devices. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in some embodiments processors 1510 are general-purpose or embedded processors implementing any of a variety of instruction set architectures (ISAs), such as the x86, PowerPC, SPARC, or MIPS ISAs, or any other suitable ISA. For example, in some embodiments processors 1510 are graphical processor units or GPUs. In multiprocessor systems, each of processors 1510 may commonly, but not necessarily, implement the same ISA.

System memory 1520 may be configured to store program instructions, data, etc. accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 1520 may be configured to implement some or all of an automotive climate control system incorporating any of the functionality described above. Additionally, existing automotive component control data of memory 1520 may include any of the information or data structures described above. In some embodiments, program instructions and/or data may be received, sent or stored upon different types of computer-accessible media or on similar media separate from system memory 1520 or computer system 1500. While computer system 1500 is described as implementing the functionality of functional blocks of previous Figures, any of the functionality described herein may be implemented via such a computer system.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network 1585 (e.g., carrier or agent devices) or between nodes of computer system 1500. Network 1585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 1500. Multiple input/output devices may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1525, which may be processor-executable to implement any element or action described above. In one embodiment, the program instructions may implement the methods described above. In other embodiments, different elements and data may be included. Note that data may include any data or information described above.

Various example embodiments may include an apparatus comprising a protection module which is configured to selectively restrict a door, included in a vehicle, from moving through at least a portion of a sweep volume of the door, based on a determination that a dynamic element located in an environment external to the vehicle is moving along a trajectory which intersects at least a portion of the sweep volume. Some embodiments may include an apparatus comprising a protection module configured to be included in a vehicle and to selectively restrict a door of the vehicle from opening, based at least in part upon a determination that a dynamic element located in an environment external to the vehicle is located within a particular proximity distance from one or more portions of the vehicle and located outside of a field of view from an interior of the vehicle at the door. Some embodiments may include an apparatus including a protection module of a vehicle configured to communicate, to a remotely-located device, information associated with a dynamic element located externally to the vehicle, based at least in part upon a determination that the dynamic element is located within a particular proximity distance from one or more portions of the vehicle and is on a trajectory to intersect a portion of the vehicle.

Those skilled in the art will appreciate that computer system 1500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1500 may also be connected (e.g., operatively coupled) to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow. The following clauses include examples of embodiments of the systems and methods discussed above.

Clause 1. A vehicle, comprising:
a door configured to open; and
one or more processors operatively coupled to one or more sensors, the one or more processors configured to selectively restrict the door from moving through at least a portion of a sweep volume of the door, based on a determination, using the one or more sensors, that a dynamic element located in an environment external to the vehicle is moving along a trajectory that intersects at least a portion of the sweep volume.

Clause 2. The vehicle of clause 1, wherein, to selectively restrict the door from moving through at least a portion of a sweep volume of the door, the one or more processors are configured to:
determine a trajectory volume through which the dynamic element is predicted to pass when moving along the trajectory; and
determine that the trajectory volume overlaps at least the portion of the sweep volume.

Clause 3. The vehicle of clause 2, wherein the one or more processors are configured to: based on the determination that the trajectory volume overlaps at least the portion of the sweep volume, restrict the door to moving through a remainder of the sweep volume that is not overlapped with the trajectory volume.

Clause 4. The vehicle of clause 3, wherein the one or more processors are further configured to:
selectively restrict the door from moving through at least a portion of a sweep volume of the door based at least in part upon a determination that a probability that the door will be opened through at least a portion of the sweep volume during a time period in which the dynamic element is moving along at least a portion of the trajectory that overlaps with the sweep volume at least meets a threshold probability value.

Clause 5. The vehicle of clause 1, wherein the one or more processors are configured to:
based on selectively restricting the door from moving through at least a portion of the sweep volume of the door, causing a warning prompt, via one or more user interfaces installed in the vehicle, wherein the warning prompt provides an indication that the dynamic element poses a hazard if the door is opened.

Clause 6. The vehicle of clause 1, wherein the one or more processors are configured to:
selectively disable the restriction of the door from moving through at least a portion of the sweep volume of the door, based on receiving an override command.

Clause 7. The vehicle of clause 1, wherein, to selectively restrict the door from moving through at least a portion of a sweep volume of the door, the one or more processors are configured to control operation of at least one door actuator device.

Clause 8. A vehicle, comprising:
a door configured to open; and
one or more processors operatively coupled to one or more sensors, the one or more processors configured to selectively restrict the door of the vehicle from opening, based at least in part upon a determination, using the one or more sensors, that a dynamic element located in an environment external to the vehicle is:
located within a particular proximity distance from one or more portions of the vehicle, and
located outside of a determined field of view of an occupant of the vehicle.

Clause 9. The vehicle of clause 8, wherein the one or more processors are further configured to selectively restrict the door from opening based at least in part on a determination that the dynamic element is approaching at least a portion of the vehicle.

Clause 10. The vehicle of clause 9, wherein:
the portion of the vehicle that the dynamic element is determined to be approaching comprises a limited portion of the vehicle which includes the door that the protection module selectively restricts from opening.

Clause 11. The vehicle of clause 8, wherein the one or more processors are configured to:
selectively disable the restriction of the door from opening, based on receiving an override command as a result of interaction with at least one user interface installed in the vehicle.

Clause 12. The vehicle of clause 8, wherein, to selectively restrict the door from opening, the one or more processors are configured to control operation of at least one door actuator device.

Clause 13. A vehicle, comprising:
one or more sensors; and
one or more processors operatively coupled to the one or more sensors and configured to:
communicate, to a remotely-located device, information associated with a dynamic element located externally to the vehicle, based at least in part upon a determination, using the one or more sensors, that:
the dynamic element is located within a particular proximity distance from one or more portions of the vehicle; and the dynamic element is moving along a trajectory that intersects at least a portion of the vehicle.

Clause 14. The vehicle of clause 13, wherein the information communicated to the remotely-located device comprises at least one sensor data representation of the dynamic element that is generated by the one or more sensors of the vehicle.

Clause 15. The vehicle of clause 13, wherein the one or more processors are configured to communicate the information based at least in part upon a determination, using the one or more sensors, that the dynamic element is located within the particular proximity distance from one or more portions of the vehicle for at least a particular period of elapsed time.

Clause 16. The vehicle of clause 13, wherein the one or more processors are further configured to:
record, using a memory, a set of sensor data representations of the dynamic element, generated by the one or more sensors of the vehicle, based on the determination that the dynamic element is located within a particular proximity distance from one or more portions of the vehicle and is moving along a trajectory that intersects at least one portion of the vehicle; and
communicate at least the set of sensor data representations to the remotely-located device based at least in part upon a determination that the dynamic element has collided with at least one portion of the vehicle.

Clause 17. The vehicle of clause 16, wherein the one or more processors are further configured to:
communicate, to the remotely-located device, an indication that the collision has occurred, based at least in part upon a determination that the dynamic element has collided with at least one portion of the vehicle.

Clause 18. The vehicle of clause 16, wherein the one or more processors are further configured to:
continue recording and communicating sensor data representations of the dynamic element, subsequent to the determination that the dynamic element has collided with at least one portion of the vehicle.

Clause 19. The vehicle of clause 17, wherein the one or more processors are configured to:
communicate, to the remotely-located device an invitation to command activation of one or more functional mechanisms of the vehicle via interaction with an interface provided by the device, wherein the one or more functional mechanisms comprise one or more devices configured to provide an externally-observable signal to the dynamic element.

Clause 20. The vehicle of clause 17, wherein the one or more processors are configured to:
selectively activate at least one of the one or more functional mechanisms in response to receiving a command, from the device, to activate the at least one of the one or more functional mechanisms.

What is claimed is:

1. A vehicle, comprising:
one or more sensors of the vehicle; and
one or more processors operatively coupled to the one or more sensors of the vehicle, the one or more processors configured to:
determine, using the one or more sensors of the vehicle, whether an occupant has exited the vehicle;
subsequent to a determination that the occupant has exited the vehicle, determine, using the one or more sensors of the vehicle, whether another occupant is within the vehicle;
determine whether one or more environmental parameters for the vehicle exceed one or more thresholds; and
in response to determining the occupant has exited the vehicle, the other occupant is within the vehicle, and the one or more environmental parameters exceed the one or more thresholds, cause a control device of the vehicle to adjust the one or more environmental parameters to be within the one or more thresholds.

2. The vehicle of claim 1, wherein the one or more processors are configured to:
based on a determination that the other occupant is within the vehicle, provide one or more prompts to the other occupant via one or more user interfaces of the vehicle.

3. The vehicle of claim 2, wherein the one or more processors are configured to:
in response to receiving a response to the one or more prompts, lock one or more doors of the vehicle.

4. The vehicle of claim 2, wherein the one or more processors are configured to send the notification to the user device based on a determination that no response to the one or more prompts has been received.

5. The vehicle of claim 1, wherein the one or more processors are configured to:
in response to receiving a lock command from the user device, lock one or more doors of the vehicle.

6. The vehicle of claim 1, wherein the one or more processors are configured to:
detect, using the one or more sensors of the vehicle, an emergency condition associated with the vehicle; and
in response to detecting the emergency condition, execute an emergency response associated with the detected emergency condition.

7. The vehicle of claim 6, wherein the emergency response comprises opening one or more windows of the vehicle.

8. The vehicle of claim 1, wherein causing a control device of the vehicle to adjust the one or more environmental parameters comprises causing one or more climate control devices of the vehicle to adjustably control temperature or airflow within the vehicle.

9. A method, comprising:
determining, using one or more sensors of a vehicle, whether an occupant has exited the vehicle;
subsequent to a determination that the occupant has exited the vehicle, determining, using the one or more sensors, whether another occupant is within the vehicle;
determining whether one or more environmental parameters for the vehicle exceed one or more thresholds; and
in response to determining the occupant has exited the vehicle, the other occupant is within the vehicle, and the one or more environmental parameters exceed the one or more thresholds, causing a control device of the vehicle to adjust the one or more environmental parameters to be within the one or more thresholds.

10. The method of claim 9, further comprising:
based on a determination that the other occupant is within the vehicle, providing one or more prompts to the other occupant via one or more user interfaces of the vehicle.

11. The method of claim 10, further comprising:
in response to receiving a response to the one or more prompts, locking one or more doors of the vehicle.

12. The method of claim 10, wherein sending the notification to the user device is based on a determination that no response to the one or more prompts has been received.

13. The method of claim 9, further comprising:
in response to receiving a lock command from the user device, locking one or more doors of the vehicle.

14. The method of claim 9, further comprising:
detecting, using the one or more sensors of the vehicle, an emergency condition associated with the vehicle; and
in response to detecting the emergency condition, executing an emergency response associated with the detected emergency condition.

15. The method of claim 14, wherein the emergency response comprises opening one or more windows of the vehicle.

16. One or more computer-readable storage media storing instructions that, when executed on or across one or more processors, cause the one or more processors to:
determine, using one or more sensors of a vehicle, whether an occupant has exited the vehicle;
subsequent to a determination that the occupant has exited the vehicle, determine, using the one or more sensors, whether another occupant is within the vehicle;
determine whether one or more environmental parameters for the vehicle exceed one or more thresholds; and
in response to determining the occupant has exited the vehicle, the other occupant is within the vehicle, and the one or more environmental parameters exceed the one or more thresholds, cause a control device of the vehicle to adjust the one or more environmental parameters to be within the one or more thresholds.

17. The one or more computer-readable storage media of claim 16, further comprising instructions that, when executed on or across the one or more processors, cause the one or more processors to:
based on a determination that the other occupant is within the vehicle, provide one or more prompts to the other occupant via one or more user interfaces of the vehicle.

18. The one or more computer-readable storage media of claim 17, further comprising instructions that, when executed on or across the one or more processors, cause the one or more processors to:
in response to receiving a response to the one or more prompts, lock one or more doors of the vehicle.

19. The one or more computer-readable storage media of claim 17, wherein the notification is sent to the user device based on a determination that no response to the one or more prompts has been received.

20. The one or more computer-readable storage media of claim 16, further comprising instructions that, when executed on or across the one or more processors, cause the one or more processors to:
detect, using the one or more sensors of the vehicle, an emergency condition associated with the vehicle; and
in response to detecting the emergency condition, execute an emergency response associated with the detected emergency condition.

\* \* \* \* \*